US005950150A

United States Patent [19]

Lloyd et al.

[11] Patent Number: 5,950,150

[45] **Date of Patent: *Sep. 7, 1999**

[54] FIRE/LIFE SAFETY SYSTEM OPERATION CRITERIA COMPLIANCE VERIFICATION SYSTEM AND METHOD

[76] Inventors: Steven J. Lloyd, 250 S. Reynolds St. #204, Alexandria, Va. 22304; John P. Couch, 6521 Cavalier Dr., Alexandria, Va. 22307

[ * ] Notice: This patent is subject to a terminal disclaimer.

[21] Appl. No.: 08/925,142

[22] Filed: Sep. 8, 1997

Related U.S. Application Data

[63] Continuation-in-part of application No. 08/677,581, Jul. 5, 1996, Pat. No. 5,680,329.

[51] Int. Cl.[6] .................... G01F 1/00

[52] U.S. Cl. .................... 702/183; 702/184; 340/506; 340/516; 714/809

[58] Field of Search .................... 702/183, 184; 340/516, 501, 506, 514, 515, 635, 521; 364/528.11, 528.12, 528.13; 714/809, 814, 799

[56] References Cited

U.S. PATENT DOCUMENTS

| | | | |
|---|---|---|---|
| 3,788,428 | 1/1974 | Fried | 187/29 R |
| 3,882,305 | 5/1975 | Johnstone | 235/151.11 |
| 4,095,050 | 6/1978 | Beachem et al. . | |
| 4,342,985 | 8/1982 | Desjardins | 340/525 |
| 4,611,290 | 9/1986 | Henningsen et al. . | |
| 5,117,916 | 6/1992 | Ohta et al. . | |
| 5,163,517 | 11/1992 | Kozai et al. | 169/60 |
| 5,236,049 | 8/1993 | Asselin et al. . | |
| 5,302,941 | 4/1994 | Berube . | |
| 5,320,138 | 6/1994 | Ferlitch, Jr. | 137/552.7 |
| 5,332,366 | 7/1994 | Anderson . | |
| 5,454,024 | 9/1995 | Lebowitz | 379/40 |
| 5,475,364 | 12/1995 | Kenet | 340/522 |
| 5,481,260 | 1/1996 | Buckler et al. . | |
| 5,548,276 | 8/1996 | Thomas . | |
| 5,566,339 | 10/1996 | Perholtz et al. | 395/750 |
| 5,650,940 | 7/1997 | Tonozuka et al. | 364/514 |
| 5,680,329 | 10/1997 | Lloyd et al. | 364/551.01 |

*Primary Examiner*—Kamini Shah
*Assistant Examiner*—Kendrick P. Patterson
*Attorney, Agent, or Firm*—Oliff & Berridge, PLC

[57] ABSTRACT

A system and method for operational criteria compliance verification of fire/life safety systems and components whose operation, maintenance and testing are established by predetermined operational criteria, such as industry standards and fire/life safety codes. The system comprises at least one sensor for sensing at least one parameter of or resultant indicator of one or more fire/life safety system components pertinent to operational criteria compliance verification of the fire/life safety system. A recorder records and date/time stamps data from at least one sensor. The system verifies the operational criteria compliance and generates an operational criteria compliance verification report based upon the sensor data. The system in its preferred form verifies compliance with fire/life safety codes and generates a code compliance verification report based on these codes and associated industry standards. These reports can be electronically forwarded to the owner, insurer, or management company at any time, or automatically forwarded on a scheduled basis for "normal" reporting. These reports further can include maintenance and notification summaries that document components that require attention depending on the nature of the problem. In the event of "trouble" conditions requiring immediate resolution, real-time notification to appropriate entities can also be accomplished.

43 Claims, 22 Drawing Sheets

COMPLIANCE VERIFICATION REPORT

DATE/TIME:
REPORT PERIOD:
LOCATION:
UNIT NUMBER:
FIRE PUMP TYPE:
FIRE PUMP RATING (PSI/GPH):
FIRE PUMP MANUFACTURER:
FIRE PUMP SERIAL NUMBER:
FIRE PUMP DRIVER TYPE:
FIRE PUMP DRIVER MANUFACTURER:
FIRE PUMP DRIVER SERIAL NUMBER:
FIRE PUMP DRIVER - # OF PHASES:
FIRE PUMP DRIVER - VOLTAGE:
FIRE PUMP DRIVER - CURRENT:
JOCKEY PUMP TYPE:
JOCKEY PUMP MANUFACTURER:
JOCKEY PUMP SERIAL PHASES:
JOCKEY PUMP - VOLTAGE:
JOCKEY - CURRENT:

SYSTEM (PRESET) PARAMETERS:

SYSTEM PRESSURE:
JOCKEY PUMP START PRESSURE:
JOCKEY PUMP STOP PRESSURE:
FIRE PUMP START PRESSURE:
FIRE PUMP STOP PRESSURE:
NORMAL SUCTION PRESSURE:
NORMAL DISCHARGE PRESSURE:
NORMAL RUN TIME OF JOCKEY PUMP (MIN):
NORMAL RUN TIME OF FIRE PUMP (MIN):

PUMP ACTIVITY REPORT:

| PUMP | DATE/TIME | START/SYSPRESS | RUN/SUCPRESS | RUN/DISPRESS | STOP/SYSPRESS |
|---|---|---|---|---|---|

COMPLIANCE SUMMARY:

DID JOCKEY START DUE TO DROP IN SYSTEM PRESSURE (Y/N)?
DID JOCKEY PUMP STOP WHEN SYSTEM PRESSURE REACHED PRESET (Y/N)?
DID FIRE PUMP START DUE TO DROP IN SYSTEM PRESSURE (Y/N)?
DID FIRE PUMP STOP WHEN SYSTEM PRESSURE REACHED PRESET (Y/N)?
WAS DISCHARGE PRESSURE > 65% OF SYSTEM PRESSURE PRESET (Y/N)?
WAS SUCTION PRESSURE LESS THAN SYSTEM PRESET (Y/N)?

SYSTEM IN COMPLIANCE (Y/N)?

FIG. 11

MAINTENANCE SUMMARY:

OF JOCKEY PUMP ACTIVATIONS DURING REPORT PERIOD:
OF FIRE PUMP ACTIVATIONS DURING REPORT PERIOD:
AVERAGE SUCTION PRESSURE (OVER RUN TIME):
AVERAGE DISCHARGE PRESSURE (OVER RUN TIME):
MAX # OF JOCKEY PUMP ACTIVATIONS IN 24HR PERIOD:
MAX # OF FIRE PUMP ACTIVATIONS IN 24HR PERIOD:
AVERAGE RUN TIME OF JOCKEY PUMP IN REPORT PERIOD:
AVERAGE RUN TIME OF FIRE PUMP IN REPORT PERIOD:
WHEN DID RUN TIME OF JOCKEY PUMP EXCEED NORMAL RUN TIME (DATE/TIME):
WHEN DID TIME OF FIRE PUMP EXCEED NORMAL RUN TIME (DATE/TIME):
IF DIESEL DRIVER AVERAGE EXHAUST STACK TEMPERATURE OVER RUN TIME:
IF DIESEL DRIVER AVERAGE EXHAUST STACK OXYGEN LEVEL OVER RUN TIME:
IF ELECTRIC DRIVER, AVERAGE CURRENT OVER RUN TIME:
IF ELECTRIC DRIVER, AVERAGE VOLTAGE OVER RUN TIME:
AVERAGE CURRENT OF JOCKEY PUMP OVER RUN TIME:
AVERAGE VOLTAGE OF JOCKEY PUMP OVER RUN TIME:

REAL TIME TROUBLE NOTIFICATION SUMMARY:

WAS OWNER/OPERATOR NOTIFIED OF TROUBLE DURING REPORT PERIOD (Y/N)?
IF YES, REASON: (CHOICE FROM GROUP BELOW)

A. LOW SUCTION PRESSURE
B. LOW DISCHARGE PRESSURE
C. LOW SYSTEM PRESSURE
D. RUN TIME OF JOCKEY PUMP EXCEEDED PRESET
E. RUN TIME OF FIRE PUMP EXCEEDED PRESET
F. # OF JOCKEY PUMP ACTIVATION EXCEEDED PRESET IN 24HR PERIOD
G. # OF FIRE PUMP ACTIVATION EXCEEDED PRESET IN 24HR PERIOD
H. NO ACTIVATIONS OF FIRE PUMP SYSTEM DURING REPORT PERIOD

FIG. 12

Fire/Life Safety Operational Criteria Compliance Verification Report

Operational Criteria Type Selected From Group Below: (3,4)

1. Conventional Wisdom
2. Manufacturer's Recommendations
3. Industry Standards
4. Fire/life Safety Codes

| | |
|---|---|
| Date/Time: | |
| Report Period: | |
| Location: | |
| Unit Number: | |
| Type of Monitoring: | (local alarm, central station) |
| If Central Station: | (name, ph. number) |
| Fire Alarm Panel: | (mfgr., mdl.) |
| FACP Type (analog/digital): | |
| Elevator Controls: | (mfgr., mdl.) |
| No. of Elevator Banks: | (________) |
| Return to Floor(s) | (floor(s)) |
| Emergency Power: | (Y/N) |
| If Yes: | |
| Emergency Generator: | (mfgr, volts, amps, phase) |
| Switch Gear for bldg: | (Y/N) |
| Fan/smoke control: | (Y/N) |
| Stairwell Pressurization: | (Y/N) |
| Air Press/inches Hg: | (________) |
| Smoke Evacuation: | (Y/N) |
| Vacuum Press/inches Hg: | (________) |
| Smoke Dampers: | (quantity) |
| List Damper Locations: | (________) |
| List Dampers N/O or N/C: | (________) |
| # of HVAC shutdown systems: | |
| # of Fire doors to OPEN: | |
| # of Fire doors to CLOSE: | |
| Shunt/trip devices: | (________) |
| Suppression System(s): | (Y/N) |
| Fire Pump system present? | (Y/N) |
| If (Y) see Fire Pump report. | |

FIG. 22

```
Wet System:
  Zones:                              (no./quantity/location)
  Alarm Devices:                      (mfgr/type)
  Tamper Devices:                (mfgr/type)
Dry System:                           (mfgr/model)
  Zones:                              (no./quantity/location)
  Hi/Lo Air Pressure:                 (mfgr/type, Hi/Lo psi)
Preaction Systems:                    (mfgr/serial #)
  Zones:                              (no./quantity/location)
  Control Panel:                      (mfgr/serial #)
  Initiating Devices:                 (mfgr/type)
  Air Maintenance Device:             (mfgr/type, Hi/Lo psi)
Deluge System:                        (mfgr/serial #)
  Zones:                              (no./quantity/location)
  Initiating Devices:                 (mfgr/type)
Foam System:                     (mfgr/serial #)
  Zones:                              (no./quantity/location)
  Initiating Devices:                 (mfgr/type)
  Reservoir:                     (level)
Halon System:                         (mfgr/serial #)
  Zones:                              (no./quantity/location)
  Initiating Devices:                 (mfgr/type)
  Reservoir:                     (psi)
Carbon Dioxide System:           (mfgr/serial #)
  Zones:                              (no./quantity/location)
  Initiating Device:                  (mfgr/type)
  Reservoir:                     (psi)
Dry Chemical Extinguishing System:    (mfgr/serial #)
  Zones:                              (no./quantity/location)
  Reservoir:                     (psi)
```

---

FACP Activity Report

Date/Time Alarm Cause(S,H,P,F) Trouble Cause(FP,T,SYS)

Legend:

| | |
|---|---|
| S- Smoke Detector | FP- Fire Pump |
| H- Heat Detector | T- Tamper |
| P- Pull Station | SYS- System Trouble |
| F- Flow Switch | |

---

Compliance Summary:

FIG. 23

Compliance Type: Code Compliance

Did FACP "Alarm" when detectors/pull stations activated (Y/N)?
Did FACP "Alarm" when flow switches activated (Y/N)?
Did FACP send "Alarm" signal to central monitoring station (Y/N)?

Did FACP send control signal to smoke evacuation system(s) (Y/N)?
Did FACP send control signal to smoke press. system(s) (Y/N)?
Did FACP send control signal to HVAC shutdown system(s) (Y/N)?
Did FACP send control signal to elevator recall system(s) (Y/N)?
Did FACP send control signal to fire door OPEN system(s) (Y/N)?
Did FACP send control signal to fire door CLOSE system(s) (Y/N)?

Upon rcpt of control sig. did smoke evac sys(s) activate (Y/N)?
Upon rcpt of control sig. did smoke press sys(s) activate (Y/N)?
Upon rcpt of control sig. did HVAC shutdown sys(s) activate (Y/N)?
Upon rcpt of control sig. did elev. recall sys(s) activate (Y/N)?
Upon rcpt of control sig. did fire door OPEN sys(s) activate (Y/N)?
Upon rcpt of control sig. did fire door CLOSE sys(s) activate (Y/N)?

Fire Alarm Panel:
Troubles/Alarms/Actuation/Tests since last report:(________)
Did Elevators recall to designated floors? (Y/N)
During Testing? (Y/N)
During Alarm? (Y/N)
Fire alarm zones. (quantity)
Sprinkler zones. (quantity)
Were all initiating device zones tested? (Y/N)
Was emergency communication equipment tested? (Y/N)
Was remote monitoring xsmission equipment tested? (Y/N)
Were alarm notification circuits tested? (Y/N)
Did releasing solenoids/circuits, electric actuators, components energized by the fire alarm system and/or individual suppression system controllers operate properly? (Y/N)
Preaction systems? (Y/N)
Deluge Systems? (Y/N)
Foam systems? (Y/N)
Halon systems? (Y/N)
Carbon dioxide systems? (Y/N)
Dry chemical extinguishing systems? (Y/N)
Wet chemical extinguishing systems? (Y/N)
Did fire door(s) close? (Y/N)
Did emergency egress doors open? (Y/N)
Are suppression system reservoir levels correct? (Y/N)
Are suppression system pressures correct? (Y/N)

Smoke evacuation/pressurization equipment operation:
Pressure: (Inches/Hg)
Vacuum: (Inches/Hg)
Dampers Operate? (Y/N)
Dampers return to normal position? (Y/N)

FIG. 24

Shunt-trip devices operate? (Y/N)

Did secondary power supplies operate adequately? (Y/N)
Engine driven generator? (Y/N)
Batteries? (Y/N)
UPS systems? (Y/N)
Duration of secondary power test. (minutes)
  Were voltage/amps sufficient for test duration? (Y/N)
  Were voltage/amps sufficient for alarm duration? (Y/N)

Maintenance Summary:

# of FACP "Alarm" activations:
Cause: (a histogram plot of frequency of cause vs. sensor/zone)
# of FACP "Trouble" activations:
Cause: (a histogram plot of frequency of cause vs. sensor/zone)
Was scheduled FACP testing done during report period? (Y/N)
Are the smoke evacuation systems enabled? (Y/N)
Are the smoke pressurization systems enabled? (Y/N)
Are the HVAC shutdown systems enabled? (Y/N)
Are the elevator recall systems enabled? (Y/N)
Are the fire door systems enabled? (Y/N)
Power Interruptions: (Y/N)
  No. of Interruptions since last report: (quantity)
  Did Life/safety eqpt. maintain power? (Y/N)
Did the smoke evacuation system(s) activate w/o ALARM? (Y/N)
Did the smoke press. system activate(s) w/o ALARM? (Y/N)
Did the HVAC system(s) activate w/o ALARM? (Y/N)
Did the elevator recall system(s) activate w/o ALARM? (Y/N)
Did the fire door systems(s) activate w/o ALARM? (Y/N)
Did the emergency power system(s) activate w/o ALARM? (Y/N)

Real Time Notification Summary:

Notification of trouble during report period? (Y/N)
If YES, reason: (Choice from group below)

A. FACP Alarm activation
B. FACP Trouble activation
C. Fire Suppression System activation
D. Emergency Generator activation
E. Loss of main power feed
F. False Activation of HVAC shutdown system
G. False Activation of shunt(s)

FIG. 25

FIRE/LIFE SAFETY SYSTEM OPERATION CRITERIA COMPLIANCE VERIFICATION SYSTEM AND METHOD

This is a Continuation-in-Part of application Ser. No. 08/677,581, filed Jul. 5, 1996, now U.S. Pat. No. 5,680,329.

BACKGROUND OF THE INVENTION

The invention relates to a system that can verify the compliance of fire/life safety systems and/or components with (or against) a given set of operational criteria. This operational criteria can include, but is not limited to, conventional wisdom accepted within a specific organization or geographic region, manufacturer's recommendations or practices, industry standards and fire/life safety codes. By being able to verify compliance with (or against) these various operational criteria, the invention is able to make several verifications of fire/life safety systems and/or components which can include, but are not limited to, verification of the operational state of readiness and code compliance verification. Preferably, the invention verifies fire/life safety code compliance of fire/life safety systems and/or components since this is the "highest degree" (most stringent form) of compliance verification. The ability of the invention to verify compliance with (or against) any "lesser" set of operational criteria can be achieved when compliance with a "lesser" criteria is acceptable. As such, industry standards and fire/life safety codes are the operational criteria referenced herein with respect to preferred embodiments.

A building/structure's fire/life safety system is typically made up of at least one of the following, but not limited to, three stand-alone yet interrelated component (sub) systems—the fire suppression system (which includes but is not limited to the following types—water-based fire protection systems, chemical systems, halon systems, and CO2 systems), the fire detection/alarm system, and the life safety system. Each (sub)system has a unique function: the fire suppression system, that of containing, and neutralizing fire; the fire detection/alarm system, that of detecting fire and alerting building/structure occupants and fire fighting authorities of that fact; the life safety system, which in many instances is actuated by the fire alarm system, enhances the environment within a building/structure for its occupants and allows safe egress from the building/structure in the event of a fire. When more than one of these (sub)systems are present in a building/structure, they are typically combined to form an integrated fire/life safety system which protects both life and property in manner that is superior to that which could be provided by each of these (sub)systems had they not been combined to form an integrated system.

The fire/life safety system of a building/structure must be designed and installed in such a way as to ensure that its operation after installation will be in accordance with fire/life safety codes and industry standards. Once installed, however, the fire/life safety system must also be maintained and tested in accordance with these same codes and standards to ensure that its operating performance remains unimpaired; that is, it must remain code compliant and kept in a state of operational readiness, which ensures its effectiveness. Thus, there is a need for such a system to verify compliance of the entire fire/life safety system, particularly with respect to operational criteria such as fire/life safety codes and associated industry standards.

Building/structure owners, fire safety officials and the insurance industry have long ago recognized the effectiveness of fire suppression systems, particularly water-based fire protection systems to minimize loss of life and/or property due to fires. Over time, industry standards and codes were developed by the National Fire Protection Association (NFPA), Underwriters Laboratories, Inc. (UL), and Factory Mutual (FM) to standardize the design, installation, operation, testing, and maintenance of water-based fire protection systems.

Applicable standards/codes include, but are not limited to: NFPA Standard 13, which in simplified terms regulates (installation of) sprinkler systems; NFPA Standard 14, which in simplified terms regulates (installation of) standpipe and hose systems; NFPA Standard 20, which in simplified terms regulates (installation of) fire pumps; and NFPA Standard 25 which in simplified terms regulates the testing and maintenance of water-based fire protection systems. Full compliance with these standards/codes is paramount to ensure that in the event of a fire, water-based fire protection systems perform as designed. Adherence to NFPA Standard 25 is most critical since it pertains to routine testing and maintenance requirements that help ensure the successful automatic operation of a water-based fire protection system.

These testing and maintenance requirements as set forth in NFPA Standard 25, and elsewhere, are to be conducted weekly, monthly, quarterly or annually depending on the pertinent code. In simplified terms, the applicable NFPA Standard 25 codes are as follows:

(1) The fire pump system is to be tested by a qualified person once a week to determine if the fire pump starts automatically due to a drop in water pressure inside a sprinkler system, and that the fire pump produces and maintains a designated pressure for that particular system.

(2) A pressure maintenance pump, commonly referred to as a jockey pump, is required to be integral with the fire pump system for automatically maintaining system pressure. This small pump as controlled by the pressure maintenance pump controller keeps the system at a predetermined pressure so that the fire pump will only run when a fire occurs or the jockey pump is overcome by loss in system pressure. The code prohibits the use of a fire pump as a pressure maintenance device.

(3) The fire pump system must be further inspected by a qualified person for compliance with NFPA Standards 20 and 25 once a year. This person performs/witnesses the test, and certifies that the fire protection system meets code. Typically, local fire authorities and insurance entities are interested in compliance, and one or both may observe this test.

(4) Sprinkler systems, etc. also have frequent testing requirements such as, but not limited to, quarterly main drain tests, quarterly alarm device tests, weekly/monthly control valve inspection and tests, daily water tank temperature inspection, daily/weekly pump-house/valve-room temperature inspection, semi-annual water level alarm inspection, annual full flow test of preaction and deluge valves, quarterly dry pipe valve inspection, and annual trip tests.

There are several problems, however, with current practices of testing. First, each building/structure owner is for the most part left to conduct the weekly tests, unchecked and unsupervised by a higher authority. These tests are typically conducted by building maintenance personnel not specifically trained in water-based fire protection systems. At best, all that is often written down is a date, and a Yes/No (Y/N) indication of inspection, testing, or compliance on a clipboard near the controller or in the valve room. This Y/N indication is based solely on a manual or visual inspection of the system. Such testing is subject to unknown quality and reliability, as it is subject to human error. Several conditions could exist which would allow continued sub-par operational performance and/or non-compliance of the system. These include: 1) error in visually inspecting system operation, 2) negligently or falsely indicating acceptable operation when the test in fact showed sub-par operational performance levels, 3) error in performing the tests on a weekly, monthly, quarterly, semi-annual, or annual basis, and 4) falsely reporting testing when testing was not even conducted.

Fire pump tests vary for electric motor driven fire pumps and diesel engine driven fire pumps, and the sprinkler system(s) test(s) is(are) altogether different from the pump tests. The fire pump tests, in very basic terms, consist of but are not limited to the following items:

Electric fire pumps are tested for automatic start by manually opening a drain valve, which drops system pressure. If the electric fire pump successfully starts automatically, a typical test would include inspection of the following items: verification of normal pump discharge and suction pressures, rpm of pump is as rated, amperage and voltages per phase are as rated, the pump pressure relief valve is correctly adjusted, the packing glands are adjusted correctly, the fire alarm panel receives a pump running indication, the pump housing and bearing bosses are not overheating, and there are no abnormal or excessive leakages. At the conclusion of the test, the fire pump controller is turned to the "off" position and the fire alarm control panel should receive this indication and sound an audible trouble indication. When the controller is returned to the "auto" (automatic) position, the fire alarm control panel should return to its normal status.

Additional tests may include: determination of jockey pump and fire pump start and stop pressures, phase reversal or testing to ensure phase failure alarms are operating correctly, and determination that emergency electrical power is available via an automatic transfer switch. The required minimum run time for weekly testing of electrically driven fire pumps is 10 minutes. Contemporary fire pump controllers for electric motor driven fire pumps are not equipped with time clocks as are required for diesel engines, nor is there a requirement for automatic weekly testing. So, unless electrically driven fire pumps are manually started, there is no guarantee of any tests being conducted.

Diesel engine driven fire pumps are required by NFPA to have a time clock installed in the fire pump controller to automatically start the fire pump on a weekly basis. The time clock automatically tells the controller to activate a deluge valve to drop system pressure, allows the pump to operate for 30 minutes, and then stops the pump and returns the fire pump system to the normal automatic mode. Once running, inspections similar to those of the electric motor driven fire pump are to be conducted.

These inspections include, but are not limited to determining: normal pump discharge and suction pressures, that rpm of pump is as rated, that the pump pressure relief valve is correctly adjusted, that the packing glands are adjusted correctly, that the fire alarm panel receives a pump running indication, that the pump housing and bearing bosses are not overheating, and that there are no abnormal or excessive leakages. At the conclusion of the test, the fire pump controller is turned to the "off" position and the fire alarm control panel should receive this indication and sound an audible trouble indication. When the controller is returned to the "auto" (automatic) position, the fire alarm control panel should return to its normal status. Additional inspections may include: determination of jockey pump and fire pump start and stop pressures, normal operating parameters of the diesel engine, such as coolant level and temperature, oil level and pressure, etc.

The problem with this scenario is that it assumes that a qualified person is present to conduct the required inspections, when in fact, maintenance personnel do not have to be present for the automatic start and stop sequence to occur. Just because the diesel engine started and stopped automatically does not mean that a valid inspection was conducted nor that the fire pump system is code compliant. Although the pump may be started and stopped automatically by the fire pump controller, the controller has no capability to verify code compliance nor is it required by NFPA standards/codes to do so.

The fire pump controller that controls operation of the fire pump, such as that disclosed in U.S. Pat. No. 4,611,290, and built in compliance with NFPA, UL, and FM, provides automatic operation of the fire pump that typically supplements water-based fire protection systems, such as sprinkler systems. A fire pump controller is designed to control fire pump operation by detecting a drop in system pressure, which typically indicates that a sprinkler has been activated as a result of a fire. The controller then performs necessary sequential operations to activate the pump driver, either diesel, electric, or steam turbine, to pump water through the system. The fire pump then maintains a predetermined volume of water and pressure to control or defeat the fire. Existing fire pump controllers are also designed to evaluate basic system parameters essential to the automatic operation of the fire pump.

Some controllers, such as the controller disclosed in the above-mentioned '290 patent, include a program for automatically testing the diesel fire pump system on a weekly basis as referenced. Such controllers typically have a hard copy printout showing time/date stamped raw data relating to fire pump events. This data information, however, is not a code compliance verification report, nor could it ever be, since the controller in the '290 patent only prints data when the pump/engine is started and running, when attempted but failed starts occur, or when the controller is in a specific monitor mode. If nothing is ever printed, i.e. the pump/engine never runs, no specific determination of code compliance can be reached, save for an assumption that the pump/engine never ran or attempted to start.

There are even several circumstances where an automatic test is not highly reliable. For instance, the controller software program could be purposely changed or deleted to prevent the testing of a problem fire pump system. As such, a manual test or a falsified test could be substituted for the automatic test. Alternatively, drained starter batteries for the diesel driver could prevent testing initiation, as could a failed automatic time clock. Even further, automatic testing controllers, such as disclosed in the '290 patent, only evaluate the necessary system parameters needed for their own proper operation and are unable to determine the dependability of the overall water-based fire protection system, which is a prerequisite for verification of code compliance.

Furthermore, in either manual or automatic testing, there is no way for interested parties to know, other than by physically overseeing the test, whether the test was satisfactorily conducted.

The wide variety of sprinkler systems likewise have their own unique test, inspection, and maintenance requirements as set forth in NFPA Standard 25 and others. While these requirements differ from those of fire pumps, the difficulty in ensuring system code compliance does not. Since there are far more sprinkler systems than fire pump systems, perhaps by a ratio of at least 10 to 1, the need to verify code compliance of these systems is likewise amplified.

Sprinkler system test, inspection, and maintenance requirements are as diverse as the systems themselves. Requirements vary depending on system type, but can be generalized in simplified terms to include, but not be limited to: testing of flow switches, tamper switches, pressure switches, and alarm devices; and inspection of water levels, water temperature, valve-room temperatures, control valves, alarm valves, deluge valves, dry pipe valves, air pressure maintenance devices, foam supply levels, and proportioning systems. In general, these requirements shall be met by qualified personnel activating the system or simulating an activation via by-pass or test stations, and by direct visual or mechanical inspection.

Coincidentally, information from similar switches and devices is used by an attendant fire alarm control panel to: 1) determine a fire condition, 2) annunciate that fact throughout the building/structure, 3) notify/summon fire fighting authorities, 4) indicate system trouble, and/or 5) notify/activate life safety systems. As mentioned earlier, fire pump run status is also utilized by the fire alarm control panel in its decision-making process. Because of its specific purpose and design, the fire alarm control panel is exclusively a special purpose device, a reactionary unit intended for fire detection and notification and fire annunciation, and one that determines specific trouble conditions.

As can be seen, the fire alarm control panel, the fire pump controller, and the jockey pump controller all utilize similar water-based fire protection system component parameters. However, neither the three control devices singly, nor in aggregate, could ever be used to verify code compliance of the water-based fire protection system. Each control device has a specific function and each only "sees" a limited portion of the system.

There is a need for a device and method that transcends the functions of these control devices and manual testing procedures to verify that the entire water-based fire protection system is code compliant and in a state of known operational readiness and functionality.

As noted above, the fire detection/alarm system is a special purpose device, a reactionary unit intended for fire detection and notification, and one that determines specific trouble conditions. The fire detection/alarm system in and of itself is not capable, nor designed to be capable of, verifying the code compliance of itself, let alone a building/structure's fire/life safety system. So there remains a need for a system and method to determine and verify code compliance for the fire detection/alarm system as well as the entire fire/life safety system.

Fire detection/alarm systems are typically comprised of, but not limited to, the following components: the fire alarm control panel (FACP), manual pull stations, smoke detectors, heat detectors, and alarm notification devices (bells, sirens, strobe lights, etc.). Where applicable the FACP, being a control device, becomes the "heart" of a building/structure's fire/life safety system since it serves as the integration point of all pertinent signaling lines for specific indicators from the fire suppression system and control/signaling lines to the life safety system, as well as its own control and signaling lines to/from the fire detection/alarm system's detectors and alarm notification devices. When warranted, the FACP can be monitored by a central station service which serves to summon fire fighting authorities in the event of a fire and notify of particular system trouble conditions.

Fire detection/alarm system test, inspection, and maintenance requirements are as diverse as the systems themselves. These requirements vary depending on system configuration and integration to any water-based fire protection or life safety system, but based upon, but not limited to, NFPA 70, 71 and 72 (D,E,G,H, et al) can be generalized in simplified terms to include, but not be limited to: periodic (daily, weekly, monthly, quarterly, semi-annually, annually, depending on the specific code requirement) testing of smoke detectors, heat detectors, and pull stations; testing of flow switch signal, tamper switch signal, fire pump signal reception/activation; testing of alarm notification devices; and testing of central station service. In general, these requirements shall be met by qualified personnel activating the requisite system components or simulating an activation via test methods, and by direct visual or mechanical inspection.

Life safety systems include, but are not limited to, smoke evacuation systems, smoke pressurization systems, heating ventilation and air conditioning (HVAC) shutdown systems, elevator recall systems, fire door open/close systems, and crossover to emergency (back-up) power systems.

In the event of a fire, the purpose of these systems is to enhance the conditions inside a building/structure in such a way that loss of life is minimized. The smoke evacuation, pressurization, and HVAC shutdown systems attempt to prevent the spread of toxic and often deadly smoke and fumes. The elevator recall system returns all elevators to the main (exit) level; preventing further use, except by authorized personnel and ensuring that people do not become trapped inside the elevators during a fire. Fire door open/close systems ensure that critical fire doors close automatically to seal off sections of the building/structure in an attempt to retard the spread of the fire and emergency egress doors automatically open. The crossover to emergency (back-up) power system ensures that emergency electrical power is automatically applied to the building/structure's electrical distribution network so that essential fire suppression/life safety circuits remain energized. These life safety systems are typically interfaced to the FACP since the control signals that activate many of these systems originate from the fire detection/alarm system when it is in the "alarm condition"; that is, a fire condition has been detected and an alarm has been sent out. As such, they are typically tested in conjunction with the FACP.

Life safety system test, inspection, and maintenance requirements vary depending on system configuration and integration to any water-based fire protection and/or fire detection/alarm system, and based upon, but not limited to, NFPA 70, 71 and 72 can be generalized in simplified terms to include, but not be limited to: periodic (daily, weekly, monthly, quarterly, semi-annually, annually, depending on the specific code requirement) testing of smoke evacuation, smoke pressurization, HVAC shutdown, elevator recall, and fire door close/open systems when the FACP is in the "alarm condition". The general test determination being, did these systems function properly when the FACP was in the "alarm condition"? For example, did the elevator recall system send all the elevators to the main (exit) level when the FACP went into the "alarm condition"? For the crossover to emergency (back-up) power system, tests include but are not limited to: Did the system provide emergency (back-up) power to essential circuits? Did the emergency generator start in the required time? Since these life safety systems perform a vital function in preventing the loss of life, there is need to verify their code compliance, which will help ensure that these systems are kept in a state of known operational readiness, thus improving their reliability and performance.

In spite of all of these deficiencies and needs, the fire protection industryas a whole, assumes that fire/life safety problems have been particular standards, such as, but not limited to, NFPA 13, 14, 20 and 25. It further assumes that: (1) every system is being installed, maintained and tested according to the code, (2) if not, at least the required once a year inspection is sufficient to ensure safety, or (3) a better method or system of ensuring compliance is unavailable.

Such assumptions are far from acceptable when lives and property rely so heavily on the proper operability of these fire/life safety systems. The current practice of the industry offers no method of verification that such tests have actually been conducted according to the required standards. Instead, the industry relies on only a minute sampling of the system's performance, once a year (i.e., one day out of 365) by inspectors of varying capability and integrity. It then assumes that for the remaining 364 days of the year the system remains fully functional.

Thus, there is a need for a system and method capable of notifying insurers, property management companies, building/structure owners or other interested entities of any discrepancies or deviations in the preparedness of fire/life safety systems. Such a system and method will bring about more strict code compliance, through improved testing and maintenance practices, so that reliability of fire/life safety systems will be greatly increased.

There is also a need for such a system and method that can ascertain the functionality of a fire/life safety system, and on a real-time basis notify interested parties of problem conditions as they occur. Further, there is a need for such a system and method that can collect and utilize such information through statistical analysis over long time periods, which can provide historical maintenance and troubleshooting information, and which will help to reduce failures of water-based fire protection systems and increase component reliability and service life.

SUMMARY OF THE INVENTION

The present invention overcomes the deficiencies of the prior art by verifying the compliance of fire/life safety systems and/or components with (or against) a given set of operational criteria. This operational criteria can include, but is not limited to, conventional wisdom accepted within a specific organization or geographic region, manufacturer's recommendations or practices, industry standards and fire/life safety codes. By being able to verify compliance with (or against) these various operational criteria, the invention is able to make several verifications of fire/life safety systems and/or components which can include, but are not limited to, verification of the operational state of readiness and code compliance verification.

The invention according to one aspect of the invention includes a system for verifying compliance of at least one fire/life safety system component whose operation and maintenance are based upon predetermined operational criteria. The system comprises: at least one sensor for sensing at least one of a parameter of said at least one fire/life safety system component and a resultant indicator thereof pertinent to operational criteria compliance verification; means for date/time stamping sensor data from said at least one sensor; means for storing said date/time stamped sensor data; means for verifying operational criteria compliance of said at least one fire/life safety system component based upon said data and predetermined operational criteria; and means for generating a operational criteria compliance verification report based upon said sensor data. This verification report is preferably a code compliance verification report based on fire/life safety codes and associated industry standards.

According to another aspect of the invention, a method of verifying operational criteria compliance of a fire/life safety system or component thereof is achieved by sensing one or more parameters pertinent to operational criteria compliance verification of one or more components of the fire/life safety system, recording and date/time stamping data relating to such parameters, verifying operational criteria compliance based on such recorded data and predetermined operational criteria, and generating an operational criteria compliance verification report based on the sensed data. Additionally, the invention can further forward the operational criteria compliance verification report to one or more predetermined entities, such as an insurance carrier, building/structure owner, or property management firm, notify in real-time such predetermined entities of problem conditions, and can archive the recorded data and report for long term statistical analysis.

In a further aspect of the invention, the recorded data is stored on site with the fire/life safety system and is sent to a central operational criteria verifying facility off-site on a periodic basis. This off-site facility archives the data, verifies compliance with (or against) a set of operational criteria, generates a operational criteria compliance verification report, and forwards the report to one or more interested entities. Additionally, the invention may automatically generate the operational criteria compliance verification report and/or automatically forward the report to interested entities.

According to a further aspect of the invention, a system and method are provided that can ascertain the functionality of fire/life safety systems, and on a real-time basis notify interested parties of problem conditions as they occur. Further, such a system and method can collect and utilize such information through statistical analysis over long time periods, which can provide historical maintenance and troubleshooting information, as well as help to reduce failures of fire/life safety systems and increase component reliability and service life.

The invention is capable of automatically informing insurers, property management companies, and building/structure owners of any discrepancies or deviations in the standard preparedness or state of readiness, as well as verification of code compliance, of the entire fire/life safety system which can be comprised of, but not limited to, a fire suppression (sub)system, a fire detection/alarm (sub)system, and a life safety (sub)system. In doing so, the invention gives true meaning to the standards and codes referenced herein. By verifying if, when and to what degree the codes/standards are being adhered to, corrective measures can be applied throughout the industry which will improve fire/life safety, minimize risk, and reduce the loss of life and property.

As can be seen, the invention encompasses the operational criteria compliance verification of the entire fire/life safety system of a building/structure, as well as the individual (sub)systems that comprise the fire/life safety system; namely the fire suppression system, which includes water-based fire protection systems, the fire detection/alarm system and the life safety system. As previously discussed, the operational criteria preferably includes industry standards and fire/life safety codes. Each (sub) system has its own unique set of code compliance requirements and as such each needs verification of compliance and a method to determine its state of operational readiness. Just as the individual (sub)systems are integrated to form the fire/life safety system of a building/structure, the invention pulls together each (sub)system's operational requirements into an integrated fire/life safety operational criteria compliance system and method that can verify the state of readiness of the entire fire/life safety system, as well as the degree of its code compliance.

Such a system and method provide the owner/operator of the fire/life safety system with the ability to help ensure that the entire fire/life safety system and its components are kept in a continual state of operational readiness. This situation greatly benefits society as a whole. With the fire/life safety system being kept in a continual state of known readiness and functionality, the risk of loss of life and property decreases. By reducing the risk, losses decrease as well. With losses reduced, insurers will have fewer monetary payouts, and can in turn pass these savings on to the general public through reduced premiums.

BRIEF DESCRIPTION OF THE DRAWINGS

The invention will be described in detail with reference to the following drawings, wherein:

FIGS. 11 and 12 illustrate a preferred operational criteria verification compliance report with optional maintenance and real-time trouble notification summaries according to the embodiment shown in FIGS. 2 and 10;

FIGS. 22, 23, 24 and 25 illustrate a representative fire/life safety operational criteria compliance verification report with optional maintenance and real-time trouble notification summaries according to the embodiment shown in FIGS. 15–21.

DETAILED DESCRIPTION OF PREFERRED EMBODIMENTS

The invention relates to a system that can verify compliance of an entire fire/life safety system with (or against) predetermined operational criteria, such as industry standards and fire/life safety codes, by verifying the compliance of each (sub)system type present, be it a fire suppression system which can include a water-based fire protection system, a fire detection/alarm system, or a life safety system.

Due to the many combinations of types of fire/life safety (sub)systems and components, a water-based fire protection operational criteria compliance system and method is used as an exemplary system to be verified for compliance based on operational criteria that can include industry standards and fire/life safety codes. This example discussed with reference to FIGS. 1–14 serves as a "model operational criteria compliance verification system and method" for the other fire/life safety systems that may be present in a building/structure. The drawings and detailed description of preferred embodiments of the invention describe in detail the system and method applied to various types of water-based fire protection systems referenced herein. One skilled in the fire/life safety industry with knowledge of existing codes, computer programming, etc., will be able to easily adapt the invention to any particular fire/life safety system.

In reference to such an exemplary water-based fire protection system, the invention verifies the compliance of water-based fire protection systems and components whose operation and requisite maintenance and testing are established by industry standards and fire/life safety codes, with (or against) this operational criteria. Such water-based fire protection systems include, for example, sprinkler systems, wet pipe systems, dry pipe systems, preaction systems, deluge systems, combination systems, standpipe systems, water spray systems, and foam systems, each having one or more sections of pipe (zones) and one or more discharge devices (heads). These systems, when conditions warrant, are often supplemented by fire pump systems, which include a fire pump, a fire pump driver, a pressure maintenance pump (often called a jockey pump), a pressure maintenance pump controller, and a fire pump controller. More particularly, given that the operational criteria includes industry standards and fire/life safety codes, the invention relates to such a system wherein the compliance of water-based fire protection systems and components with (or against) such operational criteria is verified and an operational criteria compliance verification report, in this case, a code compliance verification report, is generated which can be forwarded to interested entities.

Figure 1:
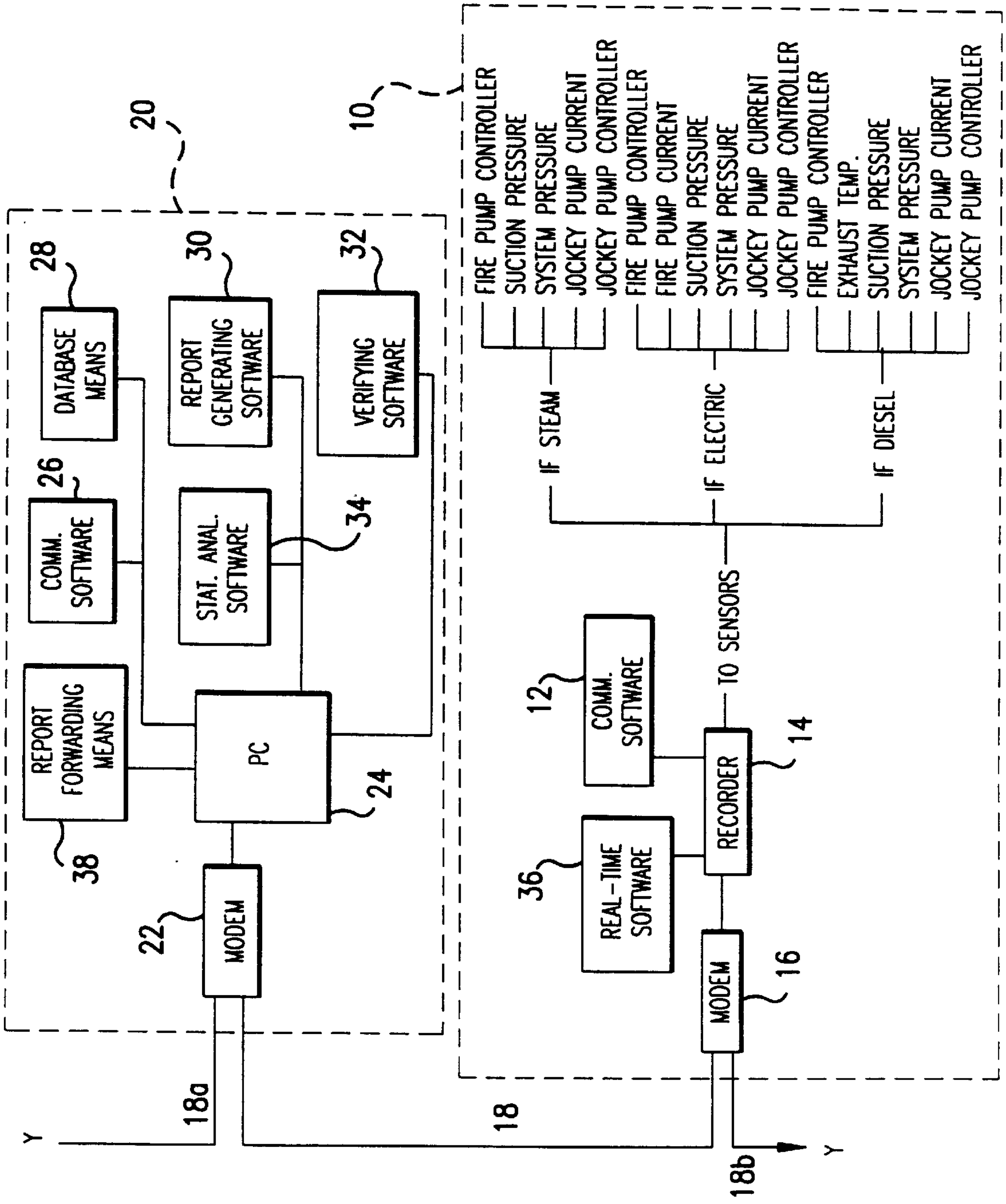
FIG. 1 illustrates a schematic representation of a fire protection operational criteria compliance verification system according to the invention.

With reference to FIG. 1, there is shown an exemplary operational criteria compliance verification system applied to a water-based fire protection system according to a preferred embodiment of the invention with representative sensor inputs including an on-site data acquiring portion 10 and an off-site central operational criteria verifying portion 20. The on-site portion 10 consists of one or more sensors that sense one or more parameters of one or more components of a fire protection system pertinent to operational criteria compliance verification. Sensors are connected to a recorder 14, which may be a microprocessor-based recorder having a memory such as RAM, ROM, or other conventional dynamic or magnetic memory systems, or a computer system capable of digitally recording sensor data, that receives signals from the sensors and date/time stamps such data for subsequent retrieval by the off-site portion 20. The sensors detect either specific physical direct parameters of the system, such as a pressure transducer sensing pump pressure or a flow sensor sensing fluid flow, or the sensors may sense indirect or resultant indicators thereof. Indirect sensing of a dial reading through a video camera, for example, is one such indirect indicator. Another would be a value or parameter that can be obtained mathematically from other parameter values. For example, in the equation V=IR, if two of the three values are known, the third can be determined. In any case, such sensors provide information pertinent to verification of whether the fire protection system's operation, installation and maintenance is in compliance with predetermined operational criteria, such as fire/life safety codes or industry standards.

The recorder 14 is connected to the off-site portion 20 by suitable communication means, such as through modems 16 and 22 and a communication link 18, which can be a hard-wired telephone line, a cellular telephone carrier, or a radio frequency (RF) communication link. The modems 16 and 22 can be any suitable commercially available modem. As the amount of data being transferred is not all that large, a fast modem, such as a 28.8 kbs modem, is not necessary but could be used.

Conventional communication software 12 within recorder 14 or externally connected to recorder 14 is provided to automatically access and connect with the off-site portion 20 of the verification system. Alternatively, suitable software 26 at the off-site portion 20 can initiate the communication between the two portions 10 and 20. Such communication software is well known and commercially available.

Additionally, the on-site portion 10 is provided with means for notifying interested entities Y, such as a building maintenance person or a property management company, of certain problem conditions in real-time. This can consist of software 36 that determines the problem conditions that warrant real-time notification, which in combination with communication software 12, modem 16, and communications link **18*b*, can notify one or more of these interested entities Y of the specific problem condition utilizing any of the following methods: pager, automated voice mail via cellular telephone or conventional telephone, electronic mail, or radio frequency (RF) link. Preferably, for integration with the archive ability at off-site portion 20, these problem condition notification events should be time/date stamped and recorded. In such a case, these problem condition notifications could be sent through the communication link 18 by communication software 12**. This event information can then be stored and archived with other system data as part of a complete record of a fire protection system's performance and reliability.

The off-site central operational criteria verifying portion 20 includes a modem 22 for communicating with the on-site portion 10 via the communication link 18 and with predetermined entities Y via communication link **18*a*. Again, any commercially available modem can be used. A personal computer (PC) 24 or other suitable processor means is connected to the modem for receiving data from the on-site portion 10. The size and power of the computer 24** will be dictated by the number of systems being monitored and the amount of data being archived and processed for each. However, it is envisioned that standard personal/business computers such as a 100 Mhz pentium computer with 16 megabytes of RAM and a fairly large hard drive, such as a 1 gigabyte hard drive or a smaller hard drive with a tape backup, could adequately handle a large number of system verifications.

The PC 24 includes suitable commercially available communication software 26, such as PROCOMM+, to coordinate communication between modem 22 and modem 16 through communications link 18 and communication between modem 22 and interested entities Y via common link **18*a*. Such communication software is capable of operating in a host mode or suitable equivalent mode in which the PC is in a waiting mode ready to receive data from one or more on-site portions 10. It can also, alternatively, initiate the PC 24 to actively communicate with and establish a communications link between the PC 24 and one or more on-site portions 10 at time intervals programmed into the PC 24. PC 24 also includes database/archive means 28** for storing the data and operational criteria compliance verification reports. This can include commercially available databases and/or spreadsheets such as DBase, Access, Paradox, Lotus 123, Quattro Pro, Excel or other suitable programs. The particular program used is primarily personal preference as most have very similar capabilities and differ mainly in presentation and user interface.

The PC 24 also includes operational criteria compliance verifying software 32 for manipulating and comparing the database/spreadsheet data with predefined operational criteria, and/or query logic to determine and verify operational criteria compliance/non-compliance. Additionally, PC 24 is provided with report generating software 30 for generating a operational criteria compliance verification report, including data from the database (actual sensed parameter values and predefined normal operating values) and an indication of compliance/non-compliance. This can comprise customized report formats selected from the particular database/spreadsheet package utilized based on the particular sensor configuration used, specific operational criteria requirements, and personal preferences as to report format, detail and overall report layout.

In its simplest form, such report software includes a printout of various sensed data, identification of the system being verified and the time period for which is was verified, along with a report summarizing compliance with a yes/no (Y/N) indication and optionally a series of particular Y/N indicators relating to particular individual requirements of the operational criteria or portion of the operational criteria being verified.

Optionally, the PC 24 can further include statistical analysis software 34 for determining maintenance and troubleshooting information based on the stored and archived data. Rather than just analyzing current information relative to benchmark normal parameters, such software looks over a larger history of the particular fire protection system's useful life and analyzes such data to determine trends that can help determine or predict maintenance schedules, reduce subsequent failures, and increase component reliability and service life.

The off-site portion 20 also includes report forwarding means 38 for forwarding the operational criteria compliance verification report to one or more predetermined entities. The report forwarding means can include manual mailing of the report to interested entities. Alternatively, via communication link 18*a* and modem 22, the forwarding means can include E-mail, facsimile or other electronic forms of forwarding the report. In a preferred embodiment, the forwarding means is automatic, such as automatic forwarding of the report electronically by E-mail, facsimile or the like. Conventional communication software can be used to forward the report.

The date/time stamped data from the equipment parameter sensors is preferably tabulated in a database or spreadsheet format. From this tabulated data, additional fields such as operational criteria compliance fields can be computed based on predetermined mathematical modeling, flag setting, boolean logic, query logic or other known computational methods to verify whether the water-based fire protection system is in compliance with existing operational criteria. Suitable reports can be generated by either manual, semi-automatic or automatic manipulation of various fields of the database in a report format that best represents a summary of operational criteria compliance or non-compliance for the system in question or its individual components. However, it is preferable for the database/spreadsheet to be programmed to automatically calculate or otherwise verify operational criteria compliance.

The operational criteria referred to in this and subsequent embodiments is intended to include, but is not limited to, conventional wisdom accepted within a specific organization or geographic region, manufacturer's recommendations or practices, industry standards and fire/life safety codes. By being able to verify compliance with (or against) these various operational criteria, the invention is able to make several verifications of fire/life safety systems and/or components which can include, but are not limited to, verification of the operational state of readiness and code compliance verification.

Figure 2:
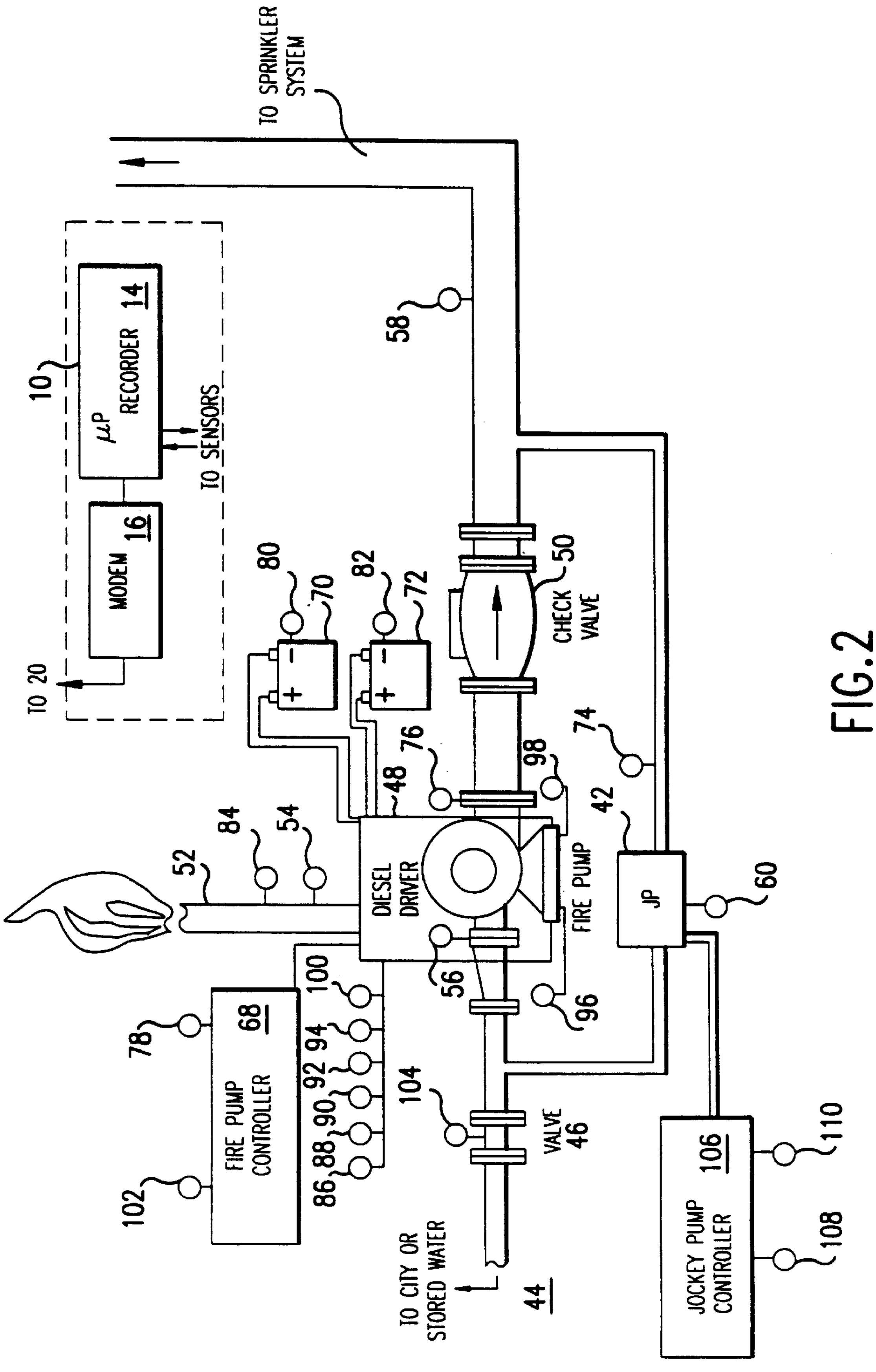
FIG. 2 illustrates a preferred sensor arrangement at an on-site portion of the operational criteria compliance verification system of FIG. 1 according to a first embodiment in which the water-based fire protection system utilizes a fire pump with a diesel engine driver.

FIG. 2 illustrates an example of a diesel driven fire pump system and an exemplary on-site portion 10 configuration. A typical fire pump system consists of a fire pump 40, a driver 48, such as a diesel driver, a pressure maintenance pump 42 (also known as a jockey pump), a jockey pump controller 106, and a fire pump controller 68 to provide and maintain a predetermined water pressure on a sprinkler system. The fire pump system acts to supply and regulate water from a city or stored water supply 44 through a supply valve 46 to a sprinkler system having one or more discharge devices. The fire pump system maintains a predetermined system pressure by activations of the pressure maintenance pump 42. The pressure maintenance pump 42 is typically an electrically driven pump that is controlled by an independent pressure maintenance pump controller 106. In the event of a pressure loss that the jockey pump cannot overcome, the fire pump 40 is activated by the fire pump controller 68 to pump additional water from city or stored water supply 44 to the sprinkler system.

In operation, the diesel driver 48 is connected to a first battery source 70 and a second backup battery source 72 that provide cranking power for a starter of the diesel driver. The fire pump controller 68 alternately activates one of two battery sets to start the diesel driver upon the detection of the reduced system pressure. Upon starting, the diesel driver 48 drives the fire pump 40 until the fire pump controller or human intervention determines that the driver is to be shut down.

The on-site portion 10 includes modem 16 and recorder 14 along with several sensors. In particular, when a diesel driven fire pump system is being verified, exhaust thermocouple 54 senses heat from diesel exhaust stack 52, indicating diesel driver 48 operation. This may be the easiest method of detecting diesel engine operation. However, it would have a delayed start reading, because the exhaust would have to reach a predetermined minimum temperature to indicate activation, and would not accurately indicate stoppage, as the exhaust requires some time to cool down even after stoppage of the engine.

Alternatively, or in addition to sensor 54, oxygen level sensor 84 can be provided to detect oxygen in the exhaust stack 52, also indicating diesel driver activation. This is a more accurate indication of engine operation and can also be used as a maintenance/diagnostic tool for engine performance.

Pressure transducer 56 detects the suction pressure at an inlet of the fire pump 40. The suction side of the pump has two pertinent pump readings: a) static pressure; and b) operating pressure. The static pressure is the "standing" water pressure available on the suction side of the pump, and/or the supply pressure when the pump is not operating. The operating pressure is the suction pressure on the inlet side of the pump. This pressure should never be negative when the pump is running nor zero when the pump is not running, which is indicative of a shut supply valve 46.

Pressure transducer 76 senses the pump discharge pressure of pump 40. This is only important when the pump is operating. Pumps have specific designed amounts of discharge pressures they must meet depending on the particular size pump and system requirements. Similarly, pressure transducer 74 detects the discharge pressure of pressure maintenance pump 42.

Pressure transducer 58 is located downstream from fire pump 40, check valve 50 and pressure maintenance pump 42 and indicates overall system pressure. This is the only method of detecting whether or not the fire pump system was activated by a "drop in system pressure." While the system can be manually activated, automatic pump operability can only be assured when the pump starts due to a predetermined drop in system pressure.

Sensors 80 and 82 are provided to detect either a measurement of battery current or battery voltage indicative of whether batteries 70 and 72 have enough remaining capacity to start diesel driver 48 and are being adequately charged.

Sensor 78 detects whether power is provided to fire pump controller 68. Most controllers switch to battery or generator backup when AC power is lost. Short term power loss may be due to known causes such as maintenance personnel working on the system. Nonetheless, sensing of this parameter is critical, as catastrophic results could be incurred if a fire emergency occurred while there was no power available and the fire pump would not activate.

Sensor 102 detects the position of the fire pump controller switch (off, manual or automatic position). Sensor 60 detects the presence of power to the pressure maintenance pump 42, indicating whether or not the electrically driven pump 42 is operating.

Sensor 86 detects the oil level in diesel driver 48 while sensor 88 detects RPM, sensor 90 detects Hobbs hours and sensor 92 detects alternator output. Sensor 94 detects hot start/block temperature of the diesel engine. Sensor 96 detects fire pump housing temperature and sensor 98 detects pump bearing temperature. Sensor 100 detects the current reading on a starter motor for diesel driver 48. These sensors provide information relevant for proper maintenance of the system. Additionally, sensor 104 detects an open or closed position of the water supply valve 46. As indicated, this is extremely important as the system cannot operate properly without a supply of water.

Other fire pump controller related parameters can be sensed. For example, most fire pump controllers have a minimum run timer and a weekly program timer. These timers can be checked for their operational status. Additionally, fire pump room temperature can be sensed. Parameters can and should also be sensed for other parts of the overall water-based fire protection system, including flow sensors or pressure sensors located within and along the sprinkler system associated with the fire pump and several other parameters that should become more apparent after the subsequent description of additional exemplary specific water-based fire protection systems in FIGS. 4–9.

These various sensors detect both operational criteria compliance verification parameters and maintenance/problem indicators and comprise commercially available sensors. Basic sensing and operational criteria verification of individual components of the system can be accomplished by sensing only one or a few of these parameters, such as suction pressure, system pressure, and pressure maintenance pump pressure. However, the more variables that are sensed, determines how comprehensive the operational criteria compliance verification report will be. It is preferable to sense enough key parameters such that verification of the entire fire protection system can be reliably determined.

Additionally, several of these optional parameters provide important maintenance related information. For example, if the pressure maintenance pump 42 over a period of time is indicated to activate more frequently than normal, this may be an indication that the sprinkler system has developed a leak. Alternatively, this may in indicate a reduction in pump efficiency due to a maintenance problem such as worn impellers.

Furthermore, several of these sensors provide information necessary to determine the existence of problem conditions that require real-time notification of the need for correction. Examples of these are sensors 80 and 82, which may indicate that both the main battery and reserve battery sets have insufficient remaining voltage to provide start up of the diesel driver. Alternatively, indicators showing that the fire pump controller 68 has lost power or the water supply valve 46 is closed are additional problem conditions that require immediate attention and action to ensure automatic fire pump operation.

Figure 3:
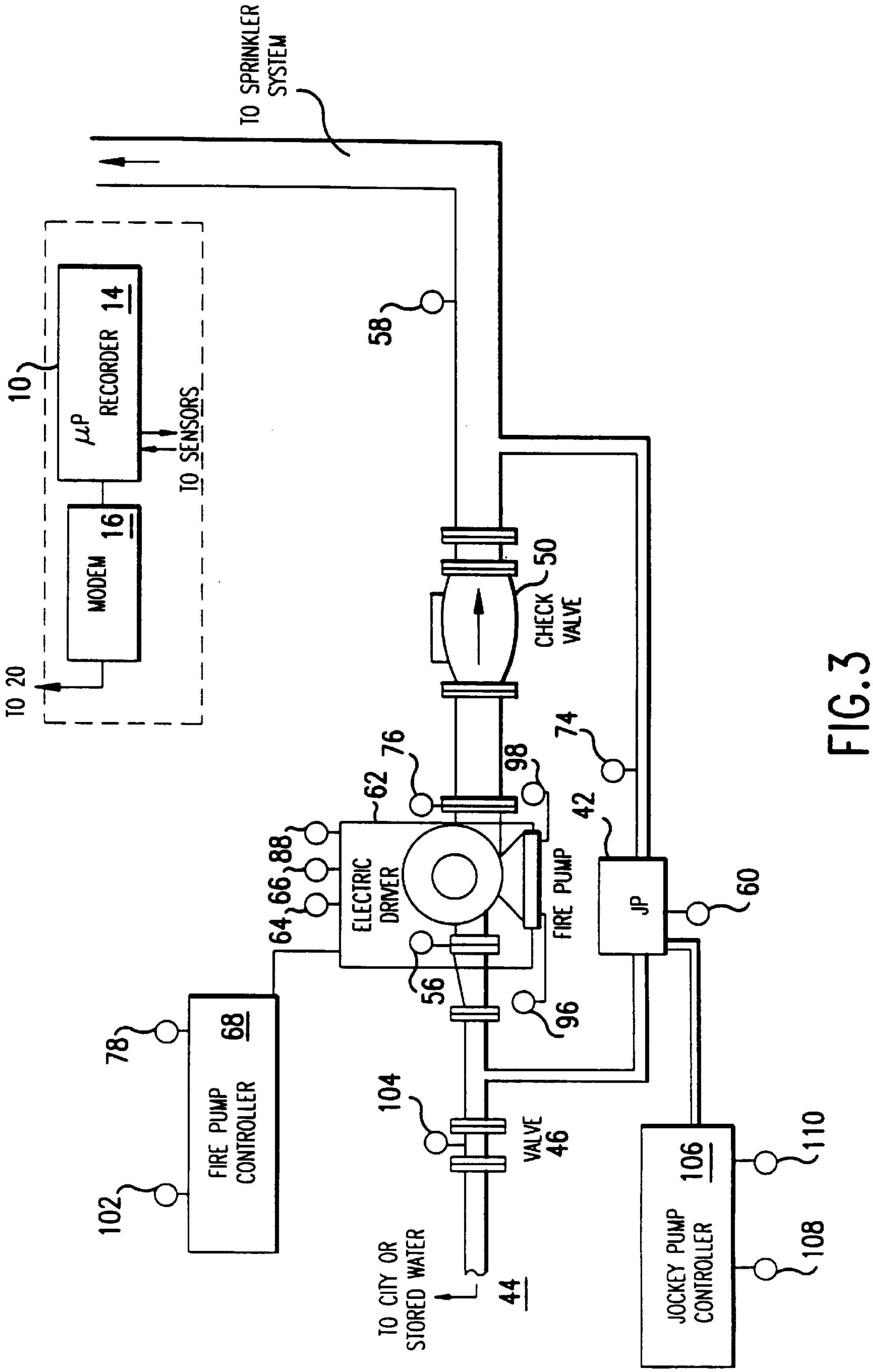
FIG. 3 illustrates a preferred sensor arrangement at an on-site portion of the operational criteria compliance verification system of FIG. 1 according to a second embodiment in which the water-based fire protection system utilizes a fire pump with an electric motor driver.

A preferred configuration for accurately verifying fire protection operational criteria compliance of a fire pump system consists of pump suction sensor 56, pump discharge pressure sensor 76, system pressure sensor 58, pressure maintenance pump discharge sensor 74, pressure maintenance pump power sensor 60, fire pump controller power sensor 78, jockey pump controller power sensor 108, jockey pump controller switch position sensor 110, fire pump controller switch position sensor 102, battery condition sensors 80 and 82, and exhaust oxygen sensor 84, as shown in FIGS. 2–3. This combination of sensors provides adequate data to ensure operational criteria compliance of each of the fire pump system components including fire pump 40, diesel driver 48, pressure maintenance pump 42, pressure maintenance pump controller 106, and the fire pump controller 68.

FIG. 3 shows a similar alternative fire pump system configuration for an electric motor driven fire pump system. Elements equivalent to or the same as those described in the previous embodiment are identified by the same reference numerals. In this example, an electric motor 62 is utilized as a fire pump driver in place of diesel engine 48. The electric motor is provided with sensors 64 and 66 that monitor motor current and motor voltage, respectively. Sensors 88, 96, 98, 102, 78 and 104 are provided to detect maintenance/problem information as in the previous embodiment.

Figure 4:
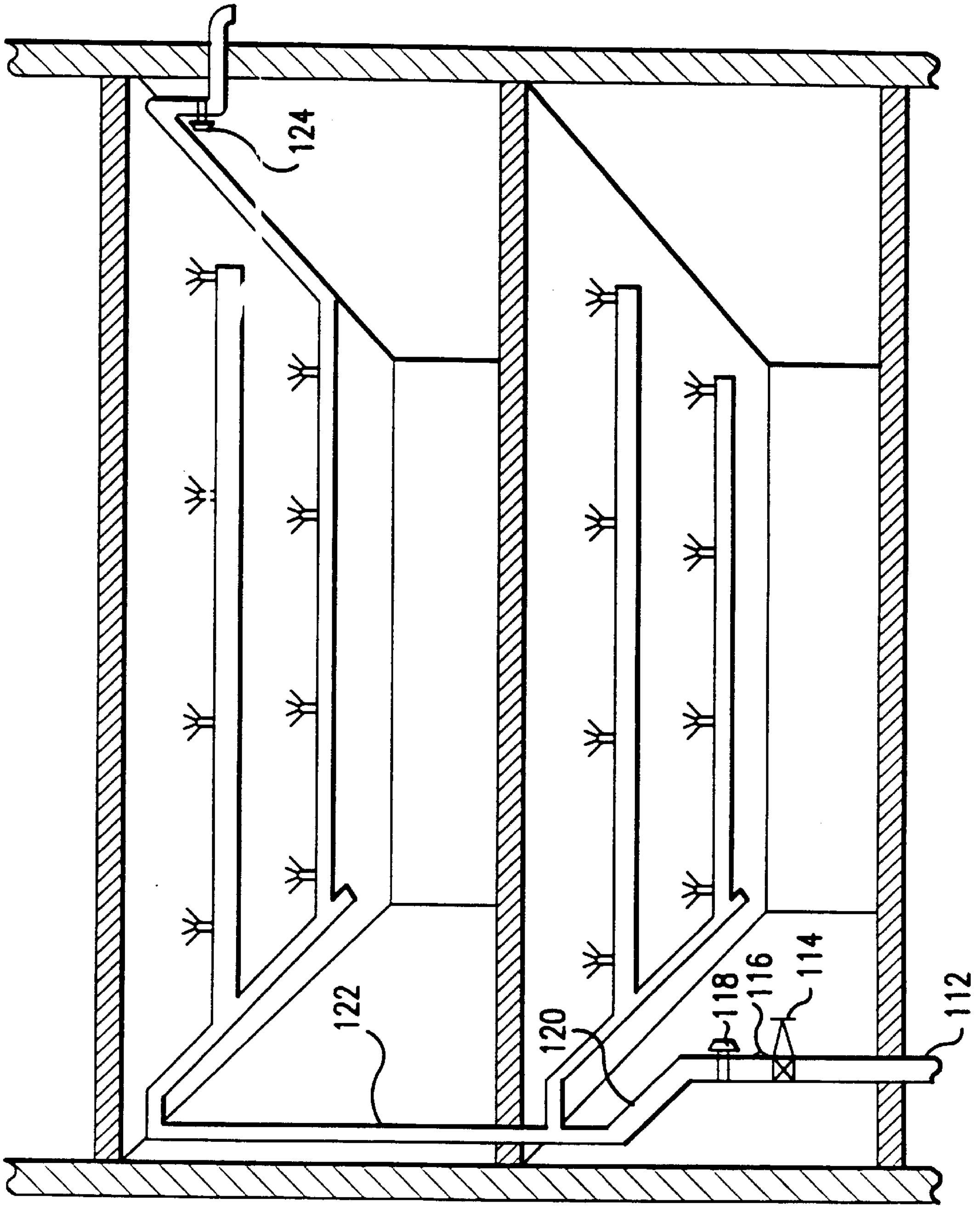
FIG. 4 illustrates a preferred sensor arrangement at an on-site portion of the operational criteria compliance verification system of FIG. 1 according to an embodiment in which the water-based fire protection system is an automatic wet pipe sprinkler system.

FIG. 4 illustrates a typical automatic wet pipe sprinkler system. Such a system can be utilized on a single story structure or can be provided on multiple story structures, such as the one shown. In such a system, water is continuously stored in a ready state within the system. Accordingly, such a system is utilized in locations where the pipe system is not subject to freezing.

Such a system typically includes several individual sprinkler heads spaced along several sections of piping (unlabeled) on each floor of the building/structure. A water supply to the system can come from a city supply, a water tank, or a reservoir and may or may not be boosted by a fire pump system such as the one described in FIGS. 2–3. An inlet from the water supply is sensed by sensor 112, which is a pressure transducer. Closure of the "city water valve", or insufficient water pressure if the system includes a fire pump, will indicate a trouble condition signifying gross non-compliance with operational criteria, as the system cannot be fully operational without an adequate supply of water. Interested parties can be notified in real-time of such a condition.

When the system is a stand alone system that does not require a fire pump, sensor 112 is installed below the main supply valve. If the system is supplemented by a fire pump, the system pressure sensor on the fire pump, such as sensor 58 in FIG. 2, replaces sensor 112.

Sensor 114 senses the position of the main supply valve and includes a supervisory tamper switch, which preferably is a position sensor. Normally the valve is in the open position. If it is closed, the sensor 114 senses this position and indicates a trouble condition. This is another trouble condition warranting real-time notification to interested parties.

Sensor 116 senses the fire protection system's alarm device. The alarm device is installed with the sprinkler system to automatically summon the fire department. Sensor 116 senses this device to insure that quarterly testing requirements of NFPA to exercise this device is performed on schedule. Sensor 116 may be a pressure switch. Alternatively, a flow switch sensor 118 could be substituted depending on the particular configuration of the fire protection system.

Sensor 120 senses system pressure via a pressure transducer. This sensor is located after the main supply valve. This assures that water is in the system at the appropriate pressure. By comparing the pressure before the main supply valve with the system pressure, it can be deduced that the valve is open and water is available for the sprinklers in case of a fire.

Sensor 122 senses a sectional valve provided to close off various "zones" within a building. Such valves are typically disabled to service or repair a particular zone without having to disable an entire system. This sensor can be a pressure transducer.

Sensor 124 is a flow switch located at a remote end of the system. Sensing of flow at this end of the system ensures that the system has not been partially disabled or blocked somewhere between the supply and the remote test location.

As previously mentioned, such a system maintains a constant supply of water within the pipes such that upon activation of one or more sprinkler heads, water will immediately flow to control or defeat the fire.

Figure 5:
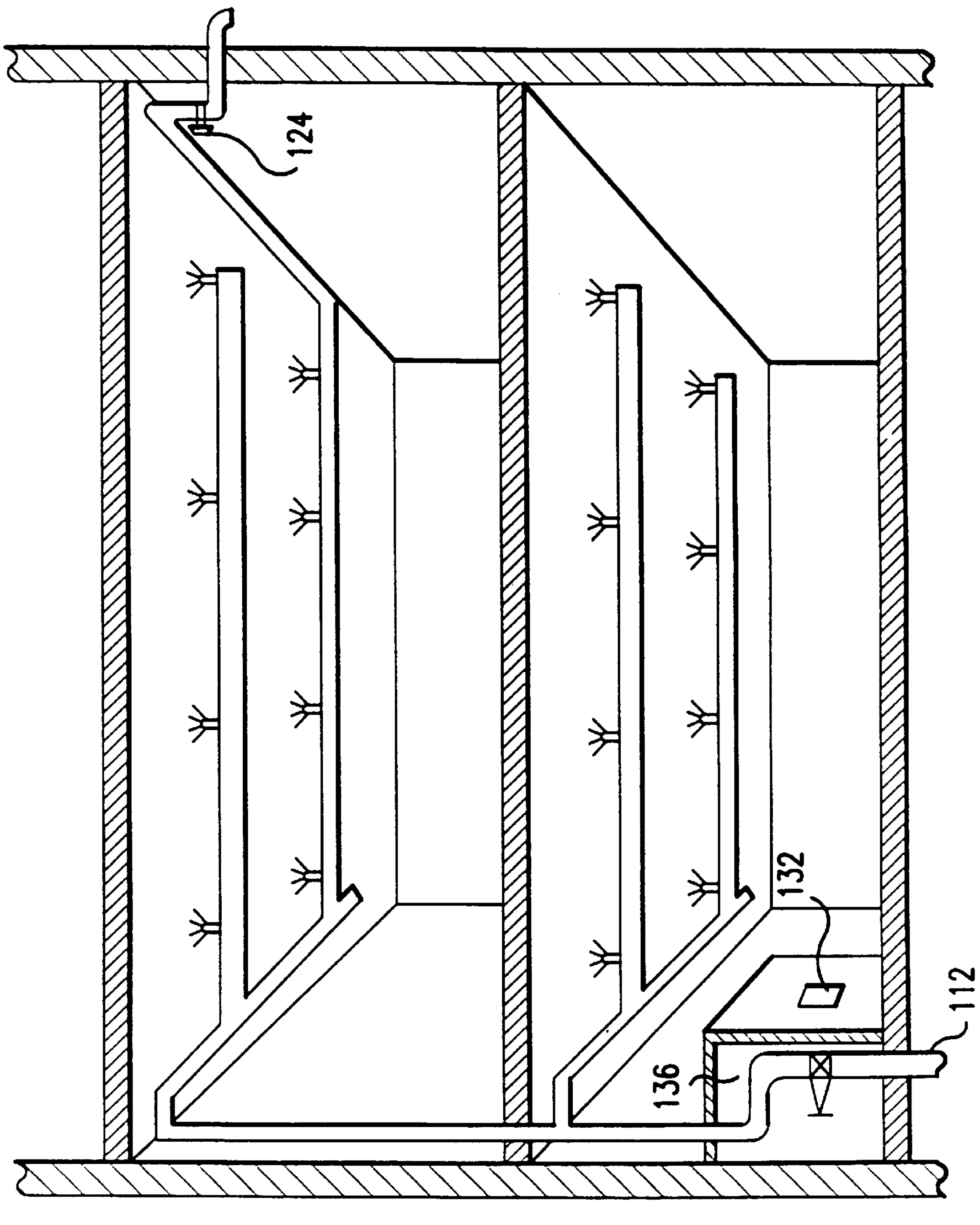
FIG. 5 illustrates a preferred sensor arrangement at an on-site portion of the operational criteria compliance verification system of FIG. 1 according to an embodiment in which the water-based fire protection system is an automatic dry pipe sprinklers system.
Figure 6:
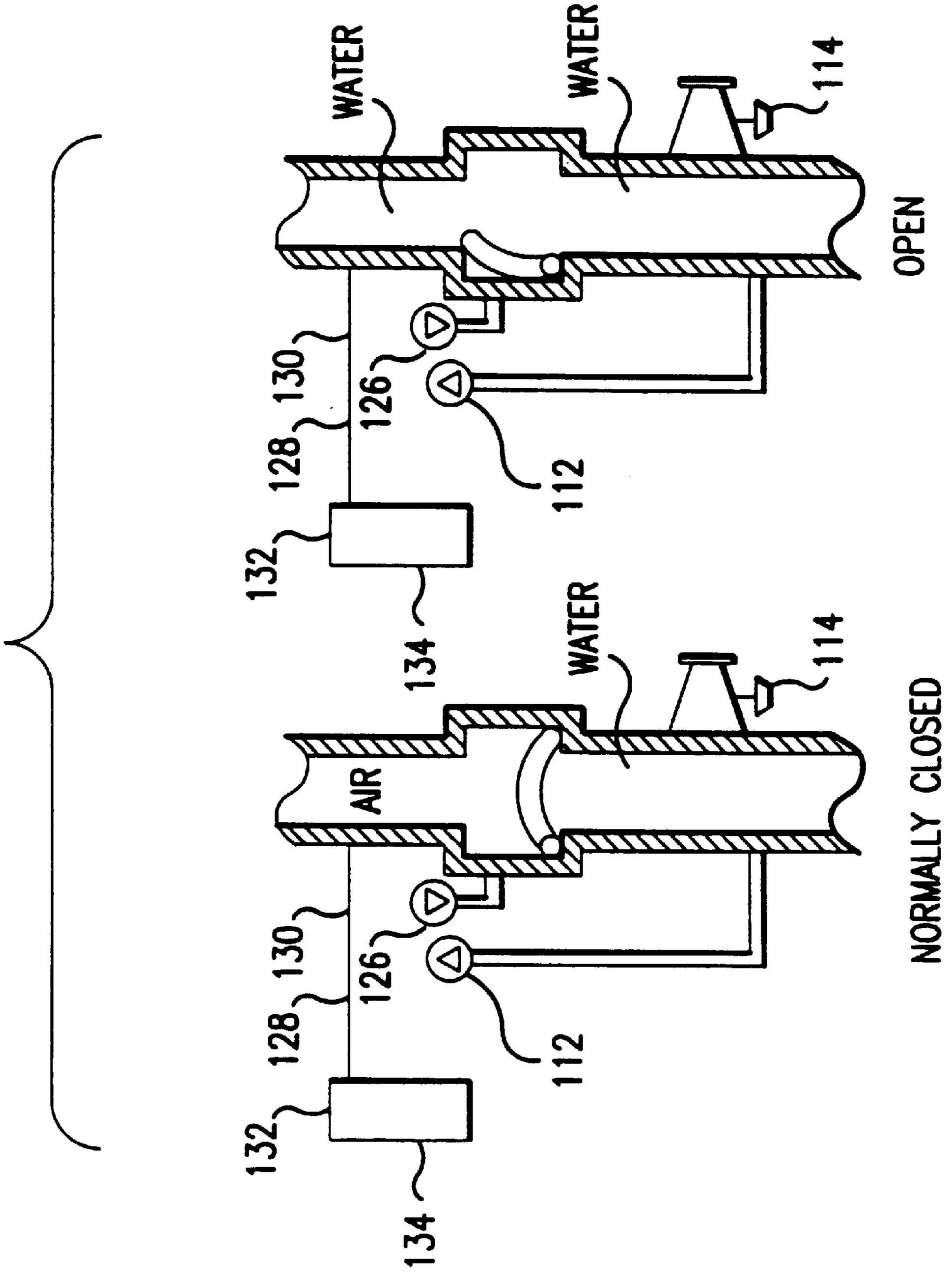
FIG. 6 illustrates a close-up view of the valve structure and sensor arrangement for the dry pipe sprinkler system of FIG.5.

FIGS. 5 and 6 illustrate a typical dry pipe sprinkler system. Dry systems are typically used in locations subject to freezing. As with a wet pipe system, various sections of pipe containing spaced sprinkler heads are provided. However, these pipes are normally filled with high pressure air, typically maintained by an air compressor. Upon detection of a fire, air escapes from the pipes through an activated sprinkler head, the dry pipe valve trips and introduces water into the system. This water flows through and out of each sprinkler head to extinguish or control the spread of the fire.

Again, as with the wet pipe system, the dry system can be a single story structure or a multi-level structure. A preferred sensor arrangement includes a sensor 112, as in the prior embodiment, for sensing water supply pressure. Also, sensor 114 senses the main supply valve and includes a supervisory tamper switch, which preferably is a position sensor. Element 126 is a dry pipe valve with a high pressure alarm switch. Activation of the switch indicates that the system has tripped and is full of water or flowing water (fire condition).

Sensor 128 is a pressure sensor that detects a high air alarm. This sensor senses that the pressure alarm switch has not stopped air compressor 134 at a preset stop pressure. Sensor 130 is a pressure sensor that detects a low air alarm. This sensor indicates whether the air compressor was activated to maintain the system air pressure. Failure of the air compressor to restore the system pressure will eventually lead to tripping of the system and flooding of the pipes with water. This is because all that restrains the water from entry into the system is the valve structure shown best in FIG. 6. Once the air pressure above the valve is proportionately less than the water pressure below the valve, the valve is opened and water flows to the system's pipes and sprinkler heads.

Sensor 132 is an air compressor power sensor that detects available power to air compressor 134. If power is removed, this indicates a trouble condition. Sensor 132 also can sense the frequency at which the compressor operates. If the compressor 134 operates too frequently, this may be indicative of a leak somewhere in the system.

Sensor 124 is a flow sensor located at a remote end of the system. Sensing of flow at this end of the system ensures that the system has not been partially disabled or blocked somewhere between the supply and the remote test location.

Sensor 136 is a temperature sensor that detects the temperature of a valve control room. As mentioned previously, dry systems are utilized in climates where a wet system would freeze and damage or prevent the system from operating properly in the event of a fire. In such a system, the main components are stored in an enclosed room. NFPA codes require such an enclosed control room to remain 40° F. or above to prevent freezing of the water below the dry pipe valve 126. Sensor 136 verifies this temperature requirement is met.

Figure 7:
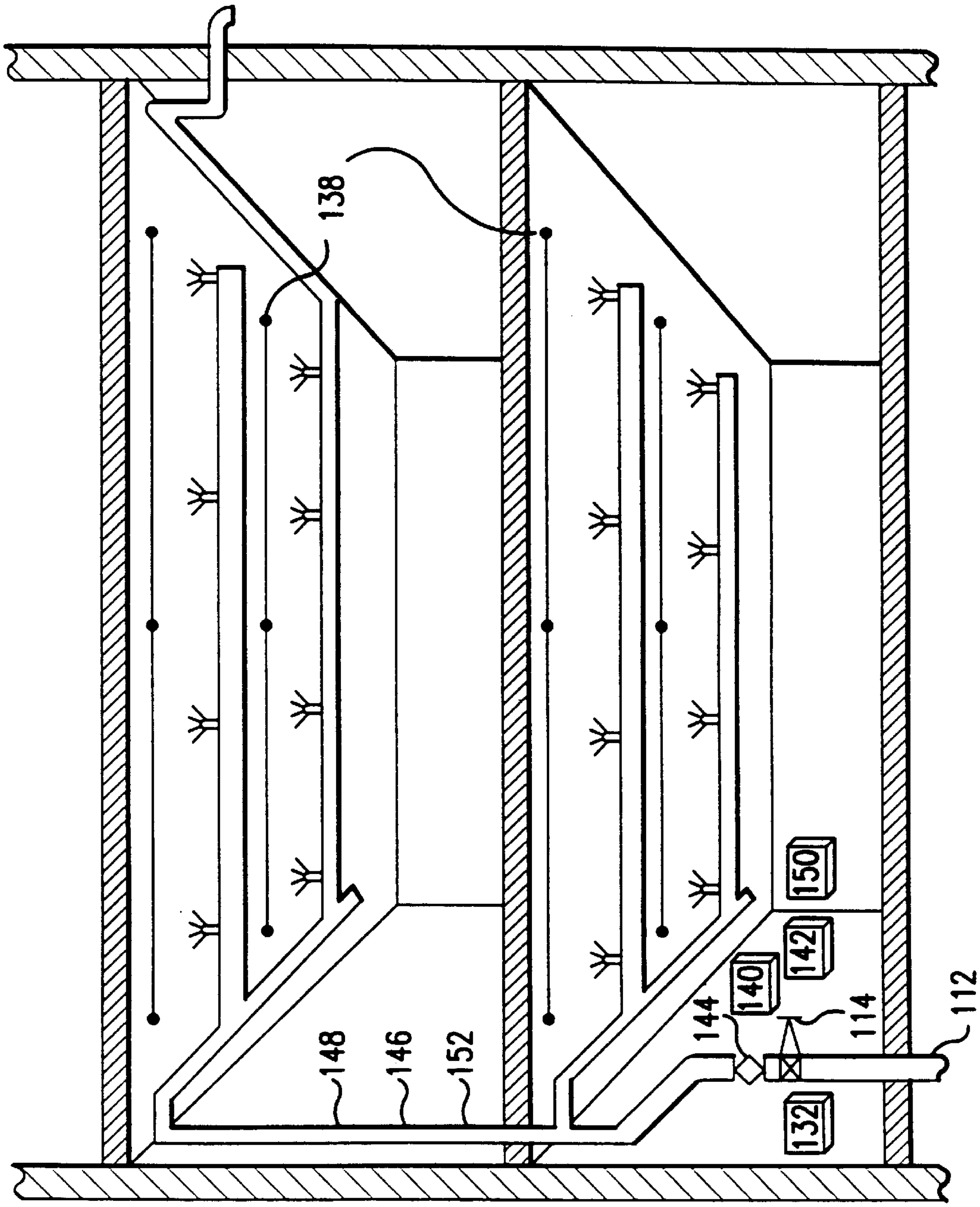
FIG. 7 illustrates a preferred sensor arrangement at an on-site portion of the operational criteria compliance verification system of FIG. 1 according to an embodiment in which the water-based fire protection system is a preaction sprinkler system.

FIG. 7 illustrates a typical preaction sprinkler system. These systems are often used in computer rooms or other rooms having sensitive equipment that can be damaged by release of water. In these types of rooms, it is not desired to release water unless a clear indication of a fire condition is established. Like the dry pipe systems, a preaction system is normally filled with air. However, rather than being filled with high pressure air, only low pressure air is required. Such a system is filled with air to ensure that the system is watertight. By monitoring the air pressure, it can be determined that the system is leak-free.

Preaction systems are two-step systems. Once a lower level threshold condition is met establishing the likelihood of a fire, a valve allowing water into the pipes is opened. However, individual sprinkler heads are not yet activated. Then, upon a higher threshold of fire probability, one or more sprinkler heads are activated only in locations actually having fires.

In a typical preaction system, various heat or smoke sensors 138 are provided in several zones within each floor. These sensors can be, but do not need to be, sensed by the present invention. Control panel 140 monitors the heat and smoke detectors and is the primary method in which the preaction system is tripped. Panel 140 may or may not be the Fire Alarm Control Panel of the building/structure. Again, this does not have to be sensed, but can be, if desired.

A preferred sensor arrangement will now be described. A sensor 142 senses the AC power to control panel 140. Failure of AC power is indicative of a trouble condition. Upon interruption of AC power to control panel 140 a battery back-up should be initiated. This back-up battery supply is sensed by sensor 150. Continued interruption of power due to inadequate backup battery voltage will also indicate a trouble condition.

Sensor 144 senses a pressure switch by which the fire alarm is initiated. This alarm is sensed to ensure the fire alarm system is operational and tested on a quarterly basis as required by operational criteria. Sensor 112 senses the water supply to the system. Preferably sensor 112 is a pressure transducer. As in the other systems, closure of the "city water valve", or insufficient supply pressure, indicates a trouble condition. As with the FIG. 4 example, if a fire pump supplements the system, the system pressure sensor on the fire pump takes the place of sensor 112.

Pressure sensor 152 senses the air pressure in the sprinkler piping. Sensor 114 senses the main supply valve. Preferably, sensor 114 is a position sensor. The valve is normally open. If a closure or partial closure is sensed, a trouble condition is indicated.

Sensor 132 senses power to the air compressor as in prior embodiments.

Sensor 146 is a pressure transducer that senses the high air alarm, indicating that the pressure switch has not stopped the air compressor at a preset stop pressure.

Sensor 148 senses the low air alarm. Again, this sensor is a pressure transducer that senses a low air pressure, indicating that the air compressor has not activated or cannot restore the system air pressure. Failure of the air compressor to restore system pressure, and if the system pressure continues to drop, may indicate a loss of system integrity. Air pressure is maintained to ensure that the system is watertight. If pressure cannot be maintained, it may indicate a leak in the system.

Figure 8:
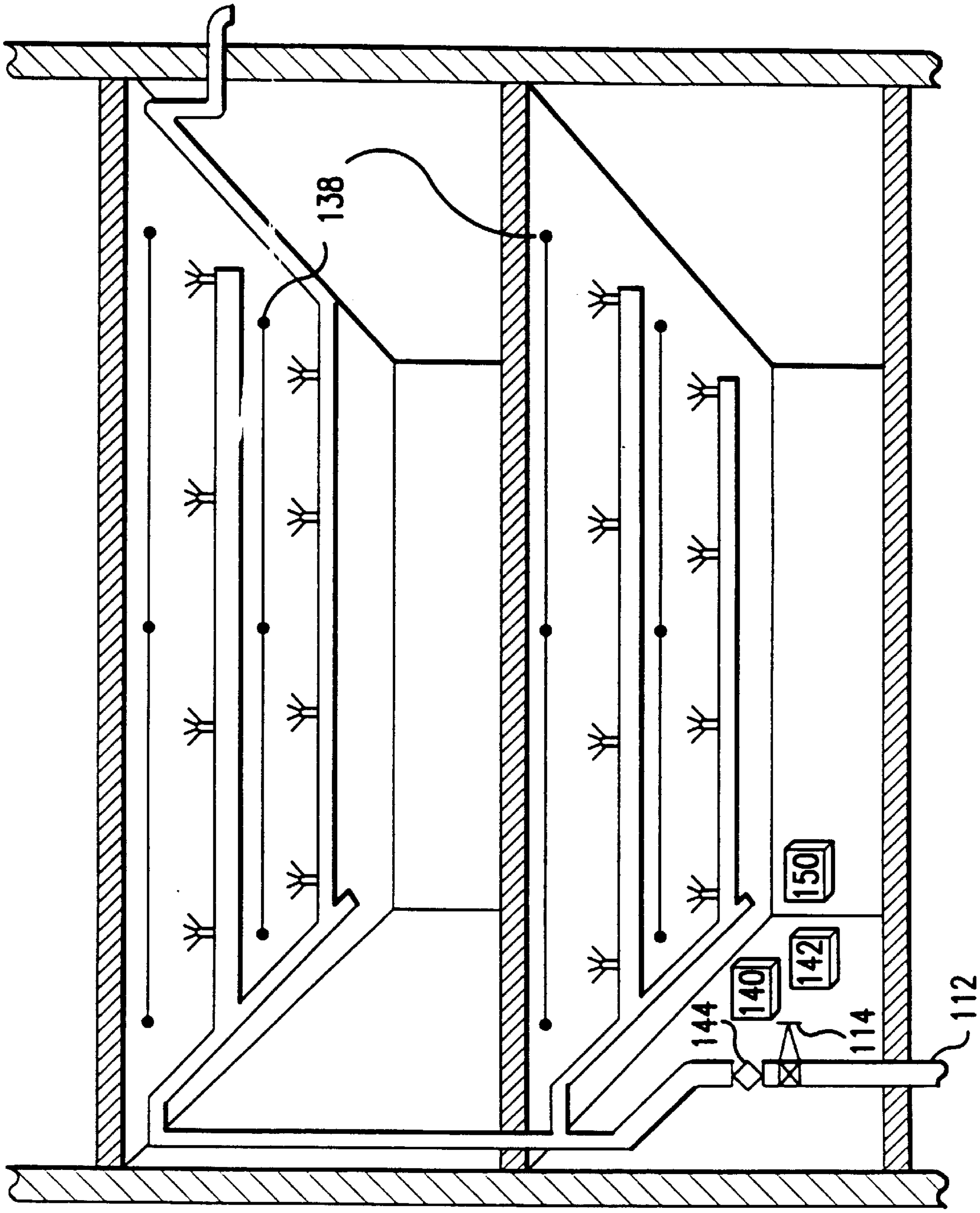
FIG. 8 illustrates a preferred sensor arrangement at an on-site portion of the operational criteria compliance verification system of FIG. 1 according to an embodiment in which the water-based fire protection system is a deluge sprinkler system.

FIG. 8 is a typical deluge system. It is similar to a preaction system, but it is not pressurized with air. Accordingly, it is provided only with sensors 138, 140, 142, 144, 112, 114 and 150 as in the previous embodiment.

Figure 9:
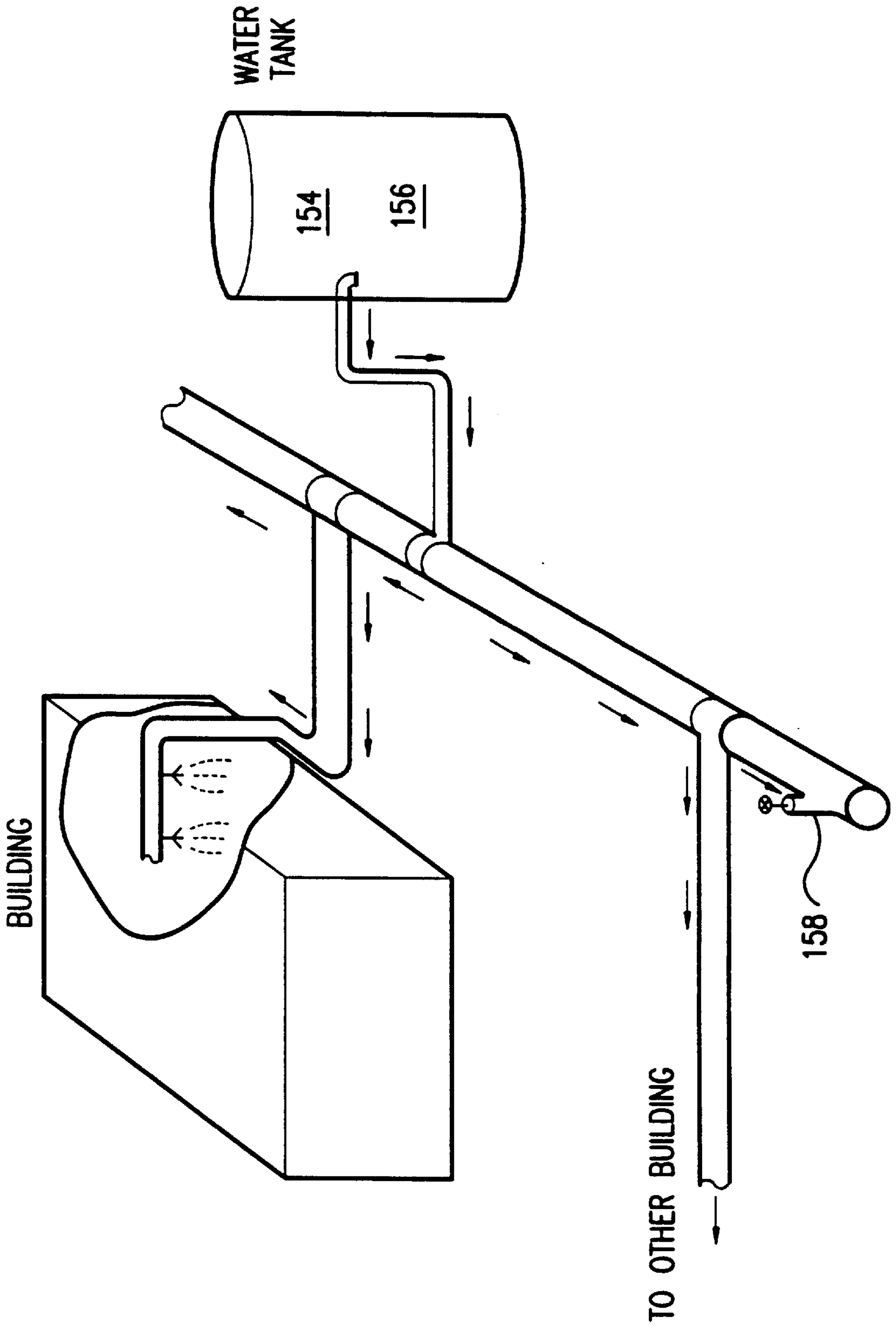
FIG. 9 illustrates a preferred sensor arrangement at an on-site portion of the operational criteria compliance verification system of FIG. 1 according to an embodiment in which the water-based fire protection system is an automatic sprinkler system having a water storage tank.

FIG. 9 is an example of an automatic sprinkler system in which water to the system is provided by a water storage tank. A sensor 154 senses the water level in the tank. Sensor 156 is a temperature sensor that senses the temperature of the tank in cold climates. Piping is provided from the tank to individual buildings and fire protection systems. Sensor 158, preferably a position sensor, is also provided at the "city water valve" located between the water supply and individual fire protection systems.

Additional conventional water-based fire protection systems can include an automatic foam-water discharge system. For this type of system, the present invention preferably includes sensors for sensing system pressure, status of flow switch, status of pressure switch, status of tamper switch, status of alarm valve, status of control valve, status of foam concentrate supply, status of proportioner, response time, discharge time, remote discharge device pressure, status of heat detectors, status of flammable gas detectors, status of smoke detectors, status of foam concentrate pump and control room temperature.

Exemplary embodiments of the preferred invention have been described for typical water-based fire protection systems. However, one skilled in the art of fire protection systems will recognize that many more systems are in use today and, most often, many complex systems are designed with two or more of these types of systems integrated together.

In order to simplify the description of complete water-based fire protection system verification, which may include verifying a fire pump system and one or more types of sprinkler systems, an exemplary preferred embodiment for verifying a portion of a typical system (i.e., a diesel-driven fire pump system) will be described with reference to FIGS. 10–14.

Actual parameters being sensed will, of course, depend on the particular systems being verified and the particular codes and standards in effect in the jurisdiction of the building/structure incorporating such system(s). However, based on the numerous embodiments of preferred sensor arrangements shown in FIGS. 1–10 and described in the specification, one skilled in the fire protection industry will be able to determine appropriate sensor parameters of a particular system to use with the inventive operational criteria verification system and method. Moreover, while the specific examples are not exhaustive, it is intended that the invention is applicable to any water-based fire protection system.

Figure 10:
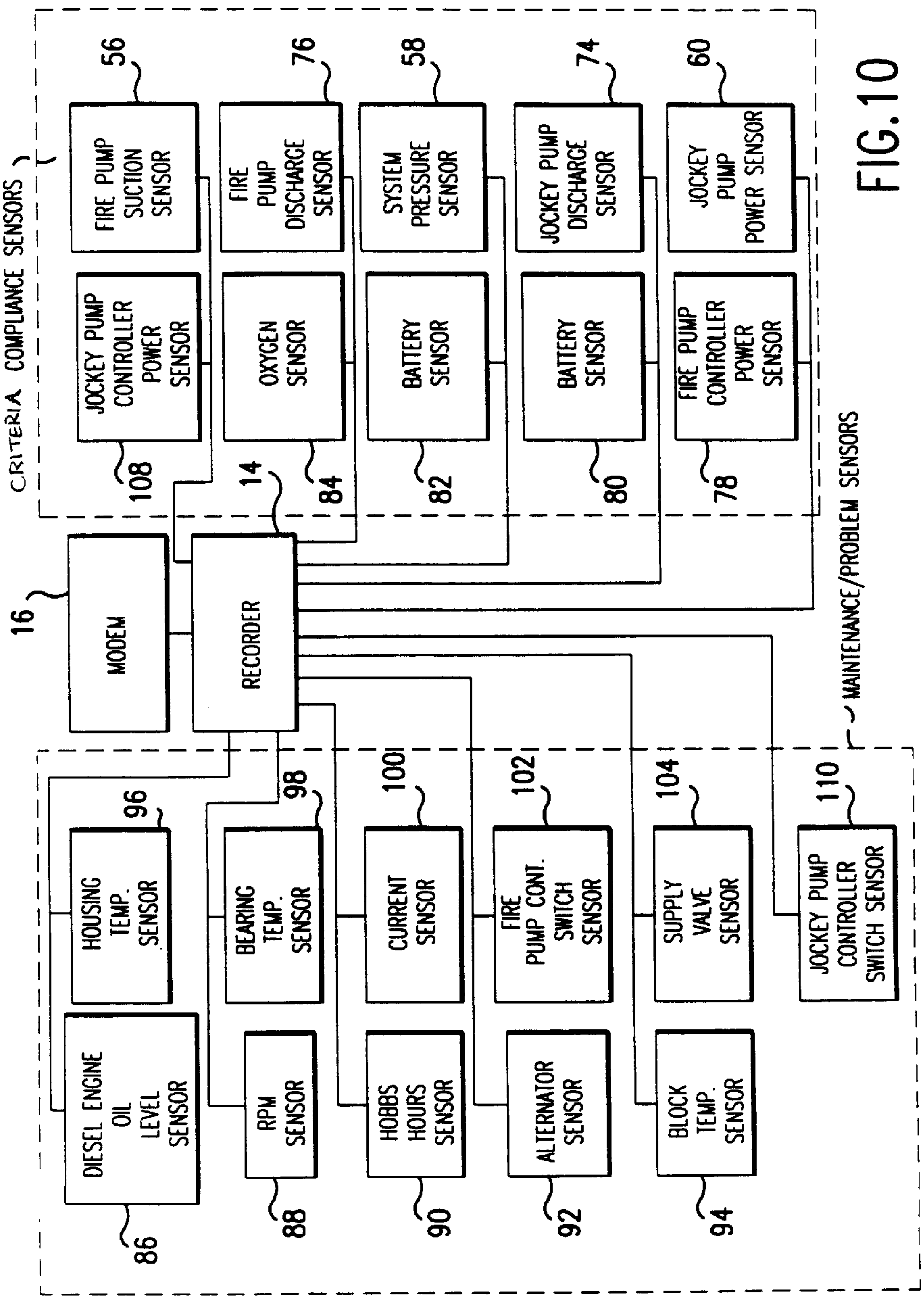
FIG. 10 illustrates a schematic of a preferred sensor arrangement for a diesel engine driven fire pump system.

FIG. 10 illustrates a preferred diesel driven fire pump system sensor configuration for verifying its operational criteria compliance. Recorder 14 receives data from fire pump suction transducer 56, fire pump discharge pressure transducer 76, system pressure transducer 58, pressure maintenance pump discharge sensor 74, pressure maintenance pump power sensor 60, fire pump controller power sensor 78, pressure maintenance pump controller power sensor 108, battery sensors 80 and 82, and oxygen level sensor 84. These sensors provide enough data to determine operational criteria compliance verification.

Additional sensors are provided to sense maintenance/problem conditions and provide a secondary level of information used to substantiate or add to verification of operational criteria compliance. These sensors include oil level sensor 86, RPM sensor 88, Hobbs hours sensor 90, alternator output sensor 92, hot start/block temperature sensor 94, fire pump housing temperature sensor 96, fire pump bearing temperature 98, diesel engine starter motor amperage sensor 100, fire pump controller switch sensor 102, jockey pump controller switch position sensor 110 and water supply sensor 104. While most of these do not provide enough data to determine operational criteria compliance on their own, they are useful for maintenance purposes to ensure reliability of the fire pump system. However, abnormally low oil level, for example, would tend to indicate the possibility of non-operational criteria compliance at a future date, because engine failure may result if low oil level is not properly remedied in the near future. Additionally, while the fire pumps and controllers may be operational according to operational criteria, an indication of supply valve 46 being turned off would also establish non-compliance, until the valve is again turned on, as the system cannot operate properly without a supply of water or with a partially closed supply valve. Likewise, if the controller is turned off, or is not in the "auto" position, the controller cannot automatically respond. Thus, while these sensors primarily detect maintenance/problem related parameters, some of these also indicate failure of the system to comply with operational criteria.

Alternatively, if the fire pump is driven by a steam turbine, the following additional parameters could be sensed: turbine steam pressure, turbine steam temperature and turbine speed governor. Suitable commercially available pressure, temperature and speed sensors can be utilized.

Recorder 14 date/time stamps data from the sensors as it is sensed and stores the data in memory. At least once a week, the acquired and stored data is transmitted to the off-site central operational criteria verifying portion 20, either by automatic communication sent through the on-site portion 10 or by automatic connection initiated by the off-site central portion 20. Once this date/time stamped data has been transmitted to the off-site central operational criteria verifying portion 20, it is stored in a database within personal computer 24 and archived for future reference.

This data is then utilized by compliance verification software 32 to determine whether the particular fire pump system or component is being maintained and can operate according to existing fire protection code(s) and meets or exceeds tolerances in industry standards set for the particular system component(s) being utilized.

For example, the software reviews the data and determines compliance/non-compliance based on the following exemplary subset of logic questions when a fire pump fire protection system is being verified: Did the jockey pump start due to a drop in system pressure? Did the jockey pump stop when system pressure reached a preset value? Did the fire pump start due to a drop in system pressure? Was discharge pressure greater than 65% of the system pressure preset? Did the fire pump stop when the system pressure reached the preset value? Was suction pressure within specified parameters? Did the fire pump system run at least once during the last reporting period, such as in the last one week? Each system will have its own set of logic questions, based in its components, to determine compliance/non-compliance.

From this determination or sequence of additional determinations, depending on the complexity of the fire protection system and number of parameters being sensed, a operational criteria compliance verification report and optionally a maintenance report are generated and forwarded to one or more predetermined entities, such as the insurance carrier, maintenance personnel or property management company.

As previously discussed, these reports may be manually forwarded by mail and/or manually, semi-automatically or automatically forwarded electronically by E-mail, facsimile or other electronic transfer. However in its most elemental form, the report method could be a red/green light combination of the system site; green indicating compliance, red non-compliance and a method for extracting data from the recorder showing compliance.

Again, based on the particular fire protection system being verified, different sensed parameters, code requirements and industry standards will apply. Based on this exemplary embodiment, one skilled in the fire protection industry with knowledge of existing codes, etc., will be able to adapt operational criteria verification to a particular fire protection system.

FIGS. 11 and 12 show an exemplary operational criteria compliance verification report, with additional and optional maintenance and real-time notification summaries, that is forwarded to the predetermined entities on a periodic basis. These particular reports are preferred reports for the fire pump system described with reference to FIGS. 2 and 10. Suitable information that identifies the fire protection system, location and reporting period are provided on the report. Additionally, normal values for the system as set by industry standards are provided as relative indicators of how the actual system is performing. Further, the report includes an activity report indicating the time/date of each pump activation occurrence, as well as start and stop times and particular values of various sensor parameters, such as system pressure, suction pressure, discharge pressure and ending system pressure.

The report further contains a compliance summary that indicates the compliance/non-compliance of the fire protection system. In its simplest form, the compliance summary may be an indicator (Y/N) stating whether the system has met or is not within compliance. Additional specific parameters may be indicated for compliance. For example, did the jockey pump start due to a drop in system pressure? Did the jockey pump stop when system pressure reached a preset value?

While not necessary, the operational criteria compliance verification report may also include a summary of maintenance and real-time trouble notification information. Such information may be useful to maintenance personnel in determining whether or not the equipment is in need of maintenance and/or adjustment, and can also provide a summary of the real-time notification(s) for a particular time period. Optionally, these maintenance and real-time notification reports can be separately generated and separately forwarded at different times than the operational criteria compliance verification report. Such optional reports may be sent to the same or differing interested entities.

It is intended that such operational criteria compliance verification reports are also archived at the off-site central operational criteria verifying facility for future reference. As such, backup copies of the report can be obtained to check the authenticity of reports, supplement lost reports, etc.

A particularly useful maintenance report can include long term statistical analysis, either automatic or manual, of past fire protection system values and readings. Review of several consecutive operational criteria compliance and maintenance reports can often determine trends useful in predicting maintenance schedules, facilitate troubleshooting of problems, or foreseeing potential problems before they occur. For instance, if over a period of reporting periods, the jockey pump is activated for longer and longer periods of time, it may indicate a growing leak in the system or a loss of jockey pump efficiency, indicating the need for maintenance thereof. This review may be manually performed or may be automatically performed by statistical analysis software 34.

Figure 13:
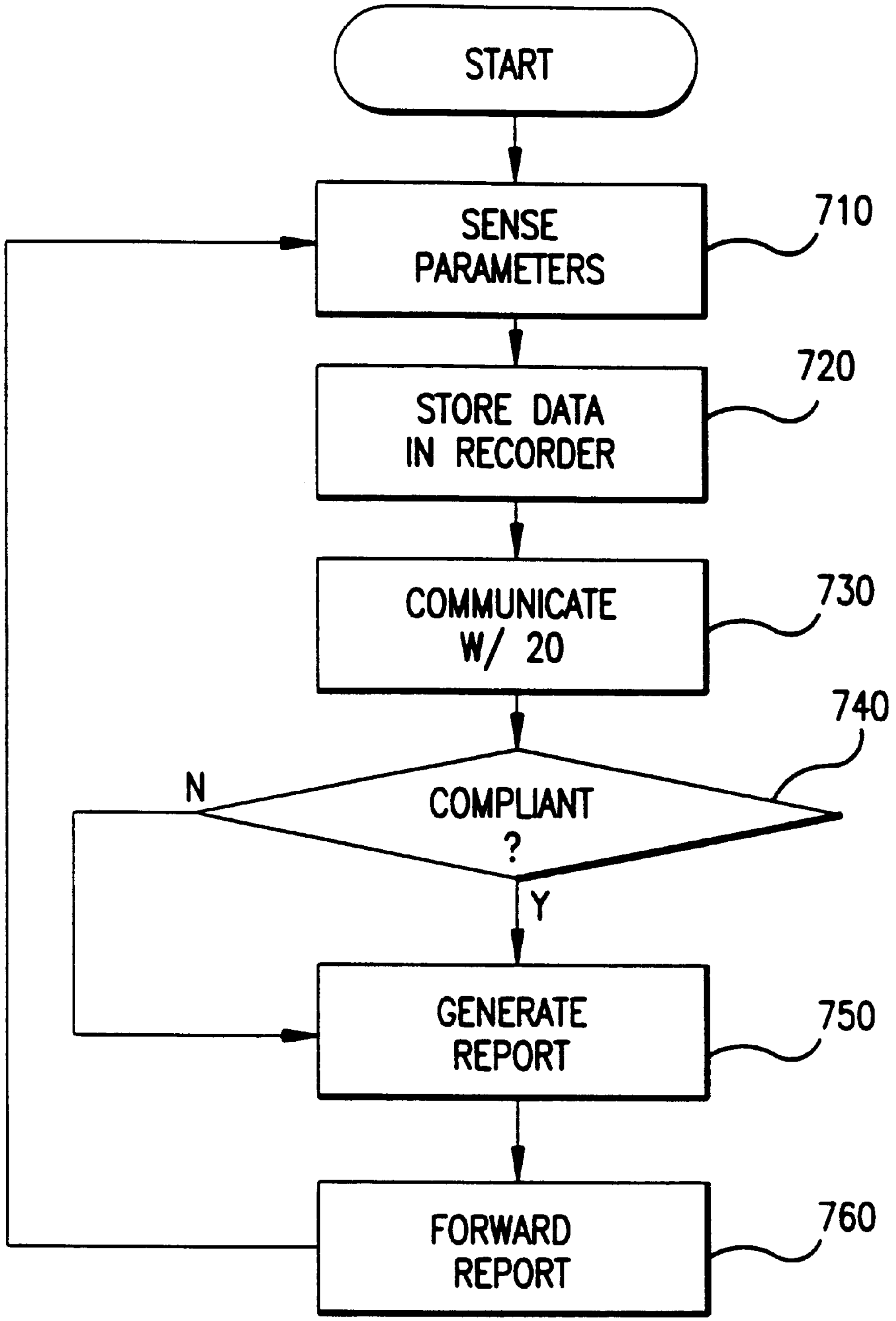
FIG. 13 illustrates a simple flow chart of a method of verifying operational criteria compliance according to all embodiments of the invention.

FIG. 13 is a simple flow chart of a preferred method of sensing parameter(s), and generating and forwarding a operational criteria compliance verification report to predetermined entities.

At Step 710, the system senses one or more parameters or a resultant indicator thereof pertinent to operational criteria compliance verification. At Step 720, the system date/time stamps the data and stores it in a recorder. At Step 730, the on-site portion 10 establishes communication between recorder 14 and off-site portion 20, allowing the data stored in recorder 14 to be accessed and stored in memory within personal computer 24. At Step 740, the system determines operational criteria compliance/non-compliance based on the sensed data, predefined industry standard values and query logic. At Step 750, the system generates a operational criteria compliance verification report and stores the report in memory within personal computer 24. At Step 760, the system forwards the operational criteria compliance verification report to at least one predetermined interested entity, such as the building/structure owner, insurance provider or property management company.

Figure 14:
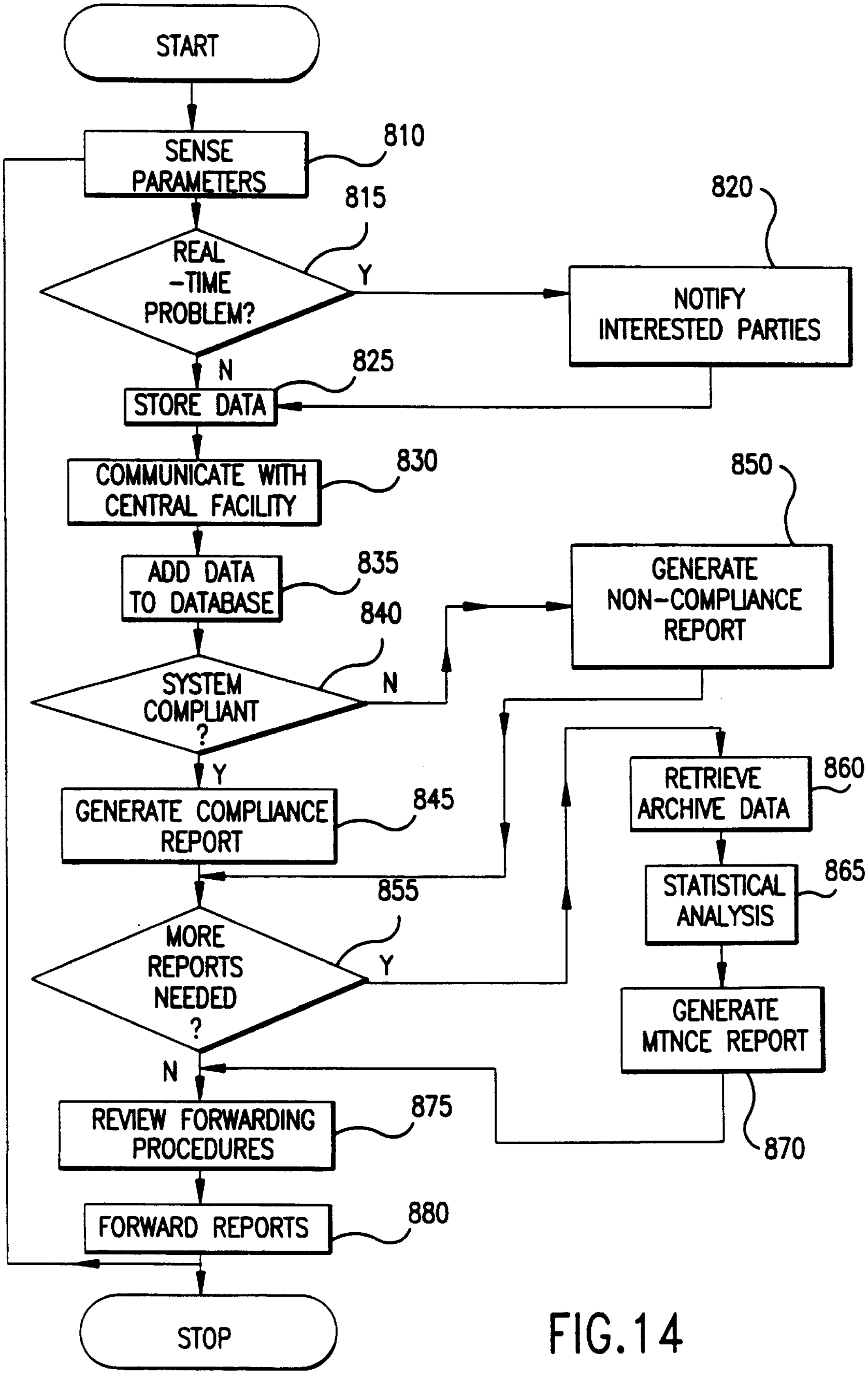
FIG. 14 illustrates a more detailed flow chart of a specific, preferred method of verifying operational criteria compliance of a fire pump system.

FIG. 14 is a more detailed flow chart of a preferred method of acquiring data, and generating and forwarding reports to one or more predetermined entities.

At Step 810, the system senses one or more parameters or a resultant indicator thereof pertinent to operational criteria compliance verification. At Step 815, the system checks for problem conditions that warrant real-time notification. If such conditions exist, interested parties are notified (in real-time) of the problem conditions (problems) at Step 820. If no such conditions exist, the process advances to step 825 in which the sensed data along with date/time data is stored in a recorder. At Step 830, the on-site portion 10 establishes communication between recorder 14 and off-site portion 20, allowing the data stored in recorder 14 to be accessed and stored in memory within personal computer 24. At Step 835, the system adds the data to an existing database tracking the data for a particular fire protection system. As step 840, the system determines operational criteria compliance/non-compliance based on the sensed data, predefined industry standard values and query logic. If compliance is found, the process advances to step 845 and a operational criteria compliance verification report is generated indicating compliance. If the system is not in compliance, a operational criteria compliance verification report indicating non-compliance is generated at Step 850. These reports may be the same, but with different information provided.

At Step 85, the system determines whether additional reports are needed. In particular, an interested party may only require the operational criteria compliance verification report. However, other parties, such as maintenance personnel or the property management company, may additionally want maintenance and real-time problem reports. If no additional reports are necessary, the process advances to Step 875. If additional reports are needed, the process advances to step 860. At Step 860, archive data is retrieved from the database. At Step 865, PC 24 conducts statistical analysis on the archived data to determine long term trends and the like that may provide maintenance information. At Step 870, the system generates a maintenance report, which may include a listing of all real-time notifications, for use by maintenance personnel as well as the building/structure owners or insurers. Depending on how the interested parties desire the reports, the operational criteria compliance and maintenance/real-time notification reports may be combined (combination of FIGS. 11–12 in one report). In most cases, this combined report is preferred. The process then advances to Step 875.

At Step 875, forwarding procedures for each fire protection system are reviewed. This information indicates the frequency and type(s) of report(s) to be forwarded, identifies the interested entities, and identifies the method of delivery (such as E-mail, facsimile, mail, etc.). Then, at Step 880, the report(s) is/are forwarded to the predetermined entities. The process then returns to Step 810 to again sense parameters.

FIGS. 15–21 illustrate preferred sensor arrangements for the invention pertaining to the remaining fire/life safety (sub)systems discussed herein—the fire detection/alarm system and life safety system(s). As mentioned earlier, the FACP serves as the integration point for the entire fire/life safety system. Since this integration can be quite complex, representative device/signal inputs/outputs and requisite sensors are only described as they interface to/with the FACP, rather than relate them back to the point of origin, much of which has been described in detail earlier in the text.

Figure 15:
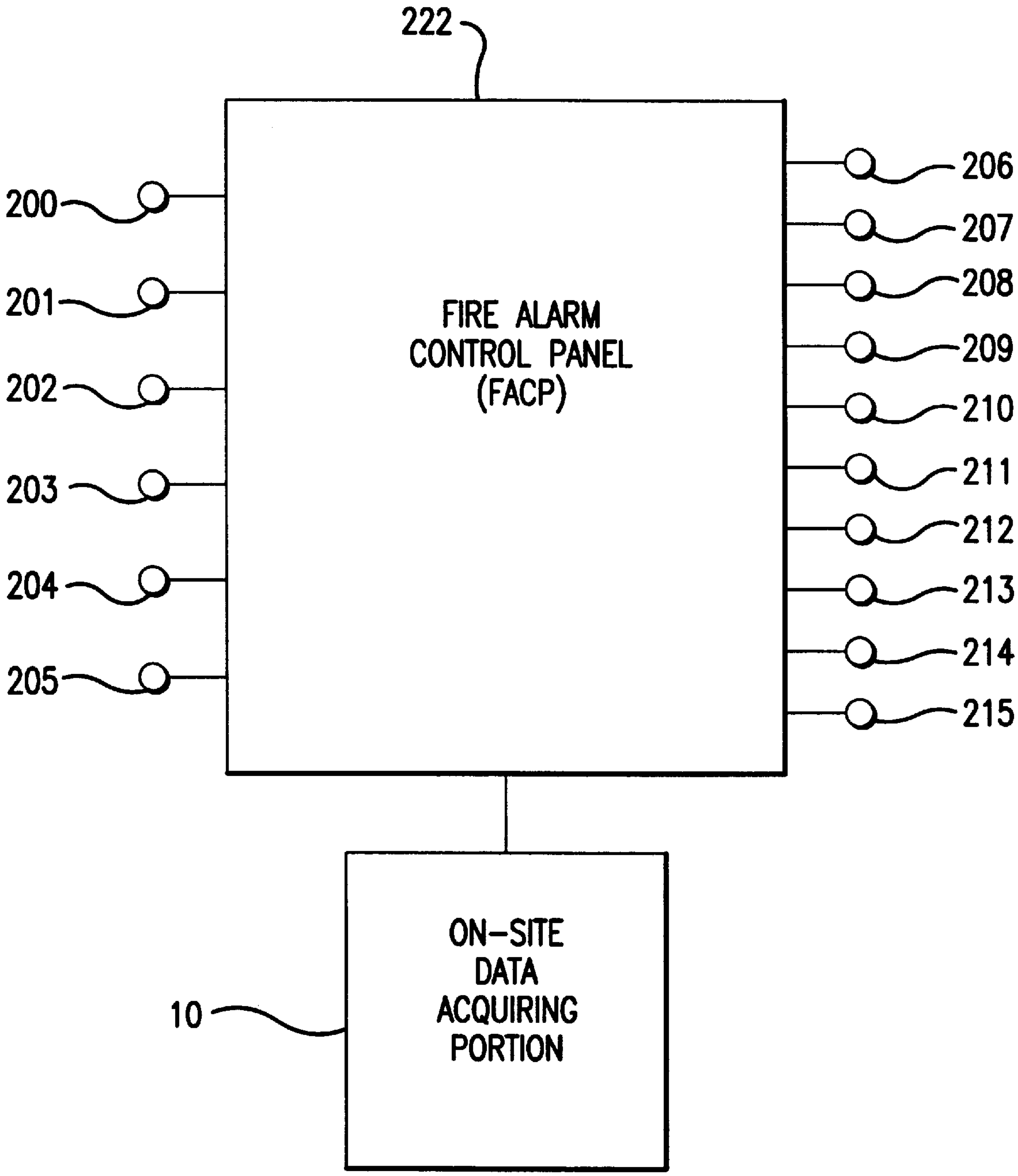
FIG. 15 illustrates a schematic of a preferred sensor arrangement for a fire detection/alarm system.

FIG. 15 illustrates a typical fire alarm control panel (FACP) 222. Sensor 200 is a power sensor which senses if FACP 222 is receiving power from the mains. Sensor 201 is a smoke detector activation sensor which senses when the smoke detectors "trip", that is, send an activation signal signifying the presence of smoke to FACP 222. Sensor 202 is the heat detector activation sensor, sensing the activation of a heat detector which indicates the presence of heat to FACP 222. Sensor 203 senses for the activation of the manual pull stations. Sensor 204 senses for the activation of the fire alarm notification devices (bells, horns, strobes, etc.). Sensor 205 senses for the presence of the control signal needed to activate the smoke evacuations system; sensor 206, the smoke pressurization system; sensor 207, the HVAC shutdown system; sensor 208, the elevator recall system; sensor 209, the fire door open/close system. Sensor 213 senses the back-up battery supply. The central station monitoring service interface is sensed by sensor 214. Activation of the fire suppression system (non water-based fire protection systems) is sensed by sensor 215.

Sensors 210–212 sense signals from the water-based fire protection system(s). Sensor 210 senses the status of the flow switch(es). The detection of water flow is indicative of the presence of a fire and serves as an alarm input to FACP 222. Sensor 211 senses the status of the tamper switch(es) which are trouble inputs to FACP 222. Sensor 212 senses the status of the fire pump and serves as a trouble input to FACP 222.

The preferred sensor types for sensors 201–215 will depend on the nature of the signals being sensed which is a function of the type of FACP (analog or digital) and could be as simple as a voltage or current sensor or as sophisticated as a digital signal decoder. Preferably sensor 200 is a voltage sensor, which senses for the presence of AC voltage.

Figure 16:
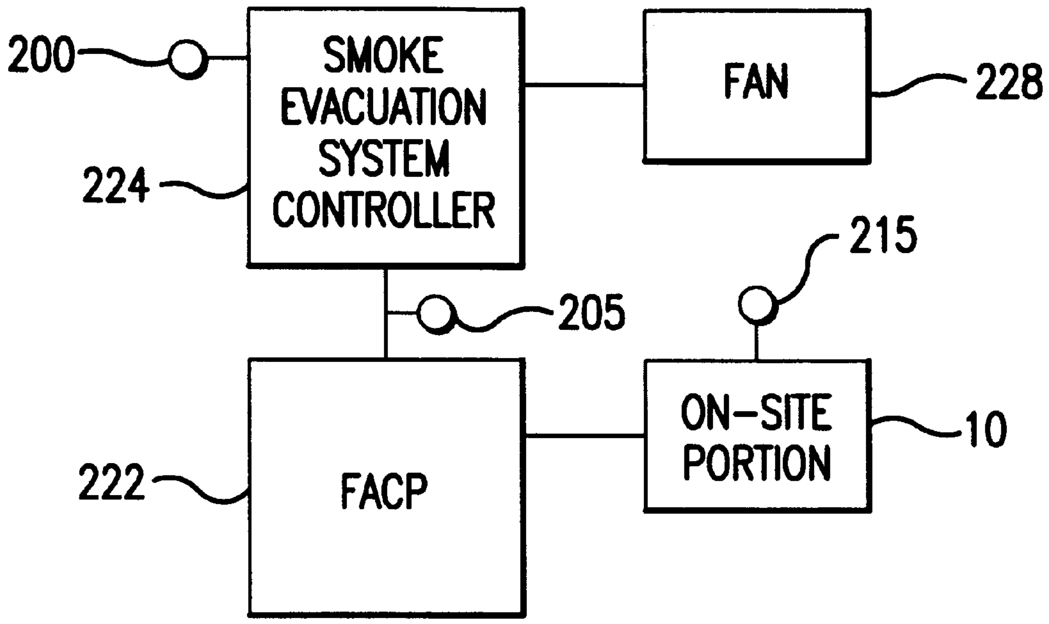
FIG. 16 illustrates a schematic of a preferred sensor arrangement for a smoke evacuation system.
Figure 17:
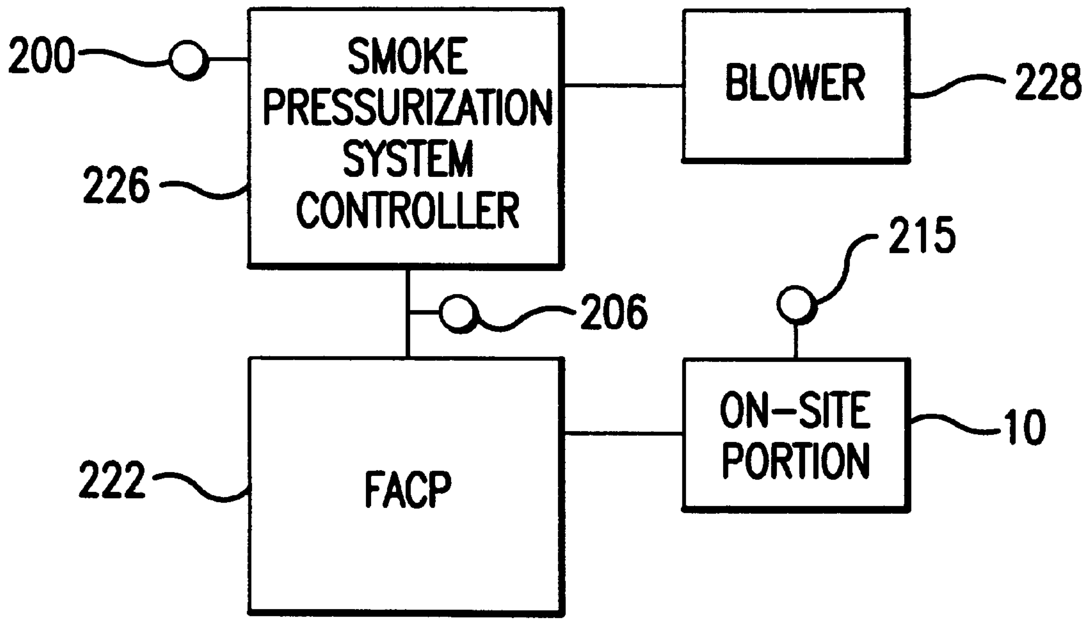
FIG. 17 illustrates a schematic of a preferred sensor arrangement for a smoke pressurization system.

FIG. 16 illustrates the preferred sensor arrangement for a smoke evacuation system. Sensor 205 senses for the presence of the smoke evacuation control signal. Once detected by a smoke evacuation system controller 224 the smoke evacuation device 228 (typically an exhaust fan) is energized and the smoke is expelled from the building/structure. Sensor 200 senses for the presence of AC power, which without, the controller will fail to operate and the fan fail to run. Sensor 215 is an air pressure sensor which senses the presence of a vacuum needed to pull the smoke from the building/structure. Similarly, FIG. 17 illustrates the preferred sensor arrangement for a smoke pressurization system having a pressurization controller 226. In this case, instead of expelling the smoke, the sections of the building/structure affected are pressurized to prevent smoke from invading. Sensor 215, being an air pressure sensor, now senses for a positive pressure, which is indicative of proper operation of the smoke pressurization system.

Figure 18:
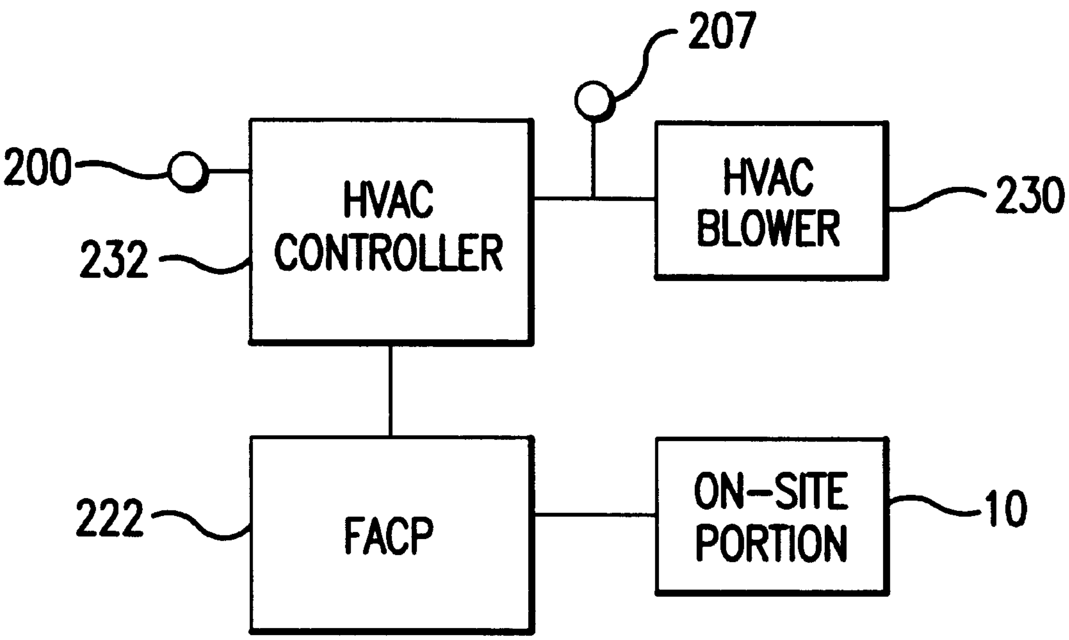
FIG. 18 illustrates a schematic of a preferred sensor arrangement for a HVAC shutdown system.

FIG. 18 illustrates an HVAC shutdown system preferred sensor arrangement. Sensor 207 senses for the presence of the proper control signal which a HVAC controller 232 interprets as the signal to shut down the HVAC system so smoke is not circulated to other parts of the building/structure. Sensor 200 senses for the presence of AC power to a HVAC blower 230 (fan). If AC power is not present, the HVAC system is considered shut down.

Figure 19:
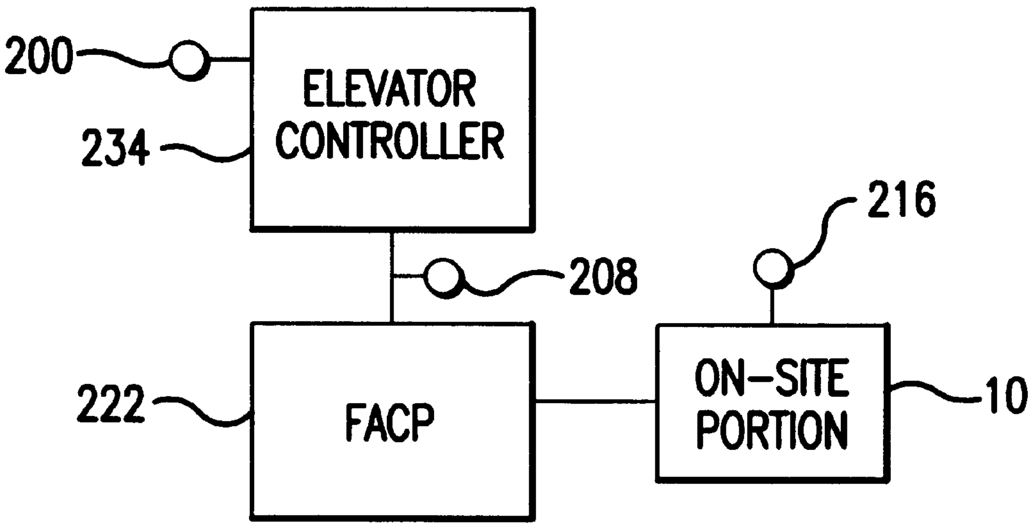
FIG. 19 illustrates a schematic of a preferred sensor arrangement for a elevator recall system.

FIG. 19 illustrates the preferred sensor arrangement for the elevator recall system. Sensor 208 senses for the proper control signal, which an elevator controller 234 interprets to recall all the elevators to the main (exit) level of the building/structure. Sensor 200 senses for the presence of AC power to the controller, for without power the elevators will not function, preventing them from being recalled. Sensor 216 is the elevator position sensor which determines if the elevators have reached the main (exit) level. Depending on the elevator shaft configuration the preferred sensor type for sensor 216 is either a photocell/break-beam detector or a magnetic proximity sensor.

Figure 20:
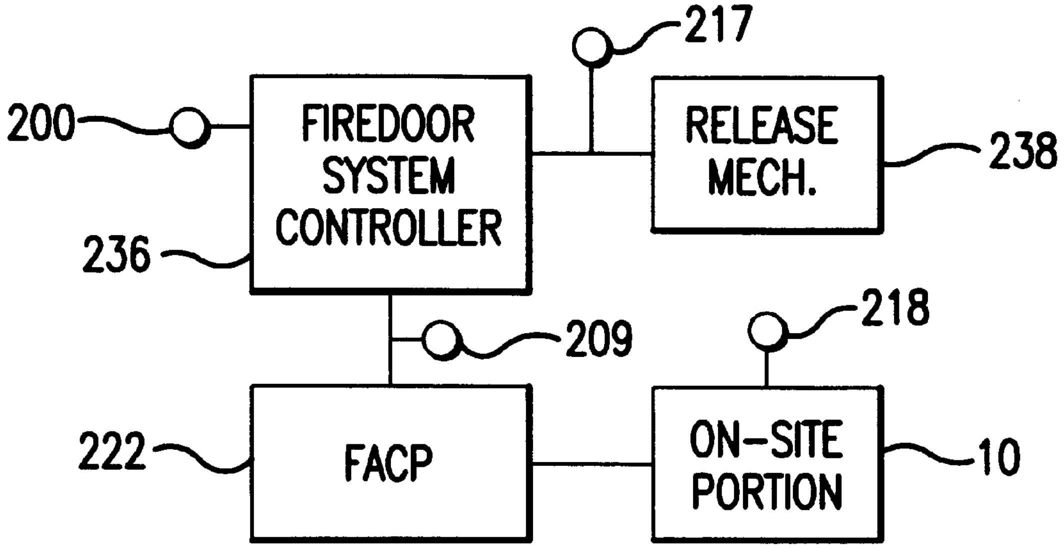
FIG. 20 illustrates a schematic of a preferred sensor arrangement for a fire door open/close system.

FIG. 20 illustrates the preferred sensor arrangement for the fire door open/close system. Sensor 209 senses for the proper control signal which a fire door system controller 236 interprets to activate one or more fire door release mechanism(s) 238 within a building or structure. Upon the activation of the release mechanism 238 as sensed by sensor 217, typically a voltage sensor, certain fire doors close (to prevent the spread of the fire) and others open (to provide egress from the building/structure). Sensor 218, preferably a magnetic proximity sensor, senses the position of the doors after the controller 236 has activated the release mechanism 238 to verify if the doors are in the proper position. Sensor 200 senses for the presence of AC power to the fire door controller.

Figure 21:
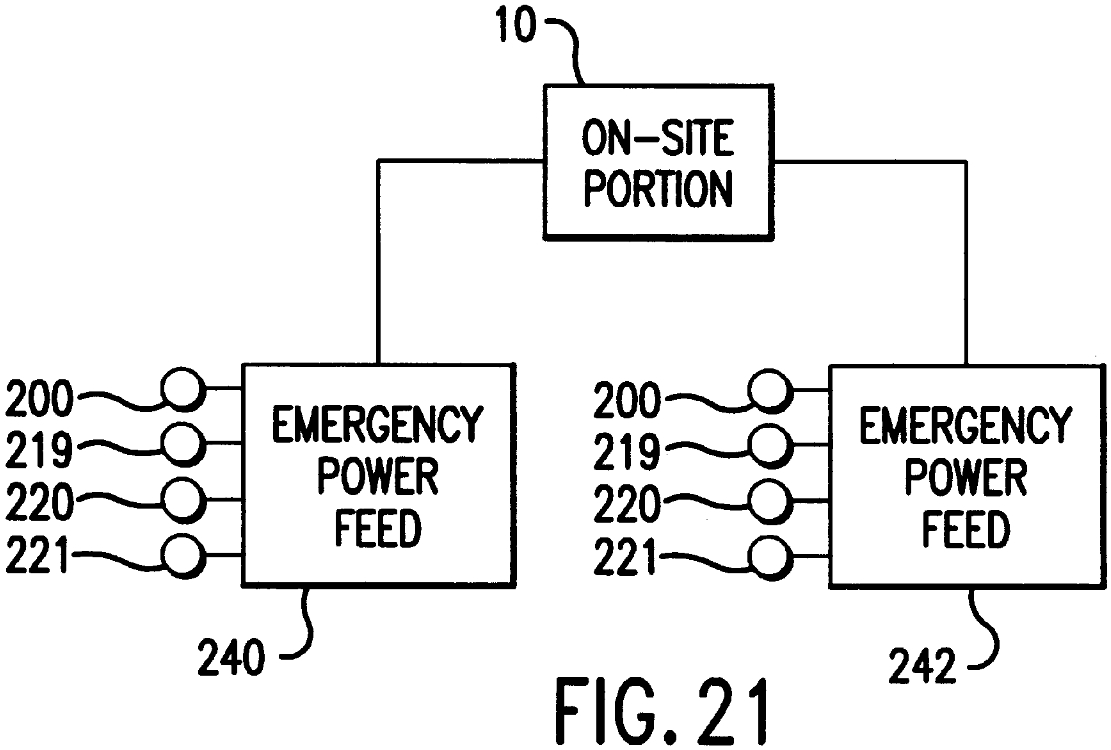
FIG. 21 illustrates a schematic of a preferred sensor arrangement for a crossover to emergency (back-up) power system.

FIG. 21 illustrates the preferred sensor arrangement for the crossover to emergency (back-up) power system. In the event of loss of main power feed 240 to the building/structure, emergency (back-up) power feed 242 is typically supplied by a generator. By sensing voltage (sensor 200), phase (sensor 219), current (sensor 220), and frequency (sensor 221) on both the main power and emergency (back-up) power feeds 240, 242 it can be determined if the proper emergency power is being supplied when no main power is present.

FIGS. 22–25 illustrate a representative Fire/Life Safety Operational Criteria Compliance Verification Report which includes a fire suppression (sub) system, a fire detection/alarm system and a life safety system. Specific operational readiness and operational criteria compliance verification reports can be generated for other fire/life safety systems based on the particular (sub)system configuration(s), parameters being sensed and verified and the various safety standards or codes regulating installation, operation and maintenance of such (sub)systems. In this preferred exemplary report, code compliance is verified based on predetermined operational criteria, which include existing fire/life safety codes and associated industry standard. One of ordinary skill can readily adapt a suitable report, based on the exemplary teachings of the invention, to accommodate the particular system(s) being sensed.

Moreover, from the exemplary flow charts and detailed descriptions, one skilled in the art of programming could readily convert the query logic and parameter comparisons used in the written examples into a suitable computer program for carrying out the verification.

The invention has been described with reference to the preferred embodiments thereof, which are illustrative and not limiting. Various changes may be made without departing from the spirit and scope of the invention as defined in the appended claims.

For example, while the inventive operational criteria compliance verification system preferably comprises an on-site portion 10, including the sensors, recorder 14 and a modem 16, and an off-site (remote) central operational criteria verifying portion 20, both portions can be provided on-site. However, if more than one fire/life safety system is being verified, it is more cost-effective to have a central portion 20 that can communicate with a plurality of independent on-site portions 10 to acquire data from and verify operational criteria compliance of several separate, independent fire/life safety systems at the same time.

Additionally, while specific fire/life safety systems have been described, various combinations of such systems, or equivalent systems, can be verified without departing from the spirit and scope of the invention.

What is claimed is:

1. A system for verifying compliance of at least one fire/life safety system component whose operation and maintenance are based upon predetermined operational criteria, the system comprising:

at least one sensor for sensing at least one of a parameter of said at least one fire/life safety system component and a resultant indicator thereof pertinent to operational criteria compliance verification;

means for date/time stamping sensor data from said at least one sensor in order to generate historic record data;

means for storing said date/time stamped sensor historic record data;

means for verifying operational criteria compliance of said at least one fire/life safety system component based upon said sensor historic record data and predetermined operational criteria; and means for generating an operational criteria compliance verification report based upon said sensor historic record data, wherein said predetermined operational criteria include fire/life safety codes and associated industry standards.

2. The system of claim 1, wherein said generating means comprises means for automatically generating the operational criteria compliance verification report.

3. The system of claim 1, further comprising means for forwarding said report to at least one predetermined entity.

4. The system of claim 3, wherein said forwarding means is automatic.

5. The system of claim 1, wherein said at least one fire/life safety system component being sensed includes a fire detection/alarm system component.

6. The system of claim 5, wherein said at least one fire detection/alarm system component being sensed further includes a component from the group consisting of a fire alarm control panel, a manual pull station, a smoke detector, a heat detector, a fire alarm signaling device, a fire suppression system interface, a fire pump system interface, a central station monitoring interface, and a life safety system interface.

7. The system of claim 6, wherein said at least one parameter being sensed is one of smoke detector activation, heat detector activation, manual pull station activation, fire alarm signaling device activation, status of fire suppression system, status of fire pump system, status of central station monitoring signal, FACP power, FACP back-up battery voltage, and FACP back-up battery current.

8. The system of claim 1, wherein said at least one fire/life safety system component being sensed includes a life safety system component.

9. The system of claim 8, wherein said at least one life safety system component being sensed further includes a component from the group consisting of a smoke evacuation system, a smoke pressurization system, a heating ventilation and air conditioning (HVAC) shutdown system, an elevator recall system, a fire door open/close system, and a crossover to emergency (back-up) power system.

10. The system of claim 9, wherein said at least one parameter being sensed is one of status of smoke evacuation system activation signal, status of smoke pressurization system activation signal, status of HVAC shutdown system activation signal, status of elevator recall system activation signal, status of fire door system activation signal, status of emergency power system, air pressure, fire door position, elevator position, AC voltage, AC current, AC phase and AC frequency.

11. The system of claim 1, further comprising means for sensing at least one of an additional parameter of said at least one fire/life safety system component and a resultant indicator thereof pertinent to component maintenance, and means for forwarding maintenance information to at least one predetermined entity based upon said sensing.

12. The system of claim 1, further comprising means for sensing at least one of an additional parameter and a resultant indicator thereof pertinent to system problem identification, and means for notifying at least one predetermined entity of problem information in real-time based upon said sensing.

13. The system of claim 1, further comprising means for archiving said data and said report as a permanent record.

14. The system of claim 13, further comprising means for analyzing said archived data for statistical analysis.

15. The system of claim 14, wherein said analyzing means utilizes the analyzed data to provide maintenance and troubleshooting information based on said data.

16. The system of claim 1, wherein said at least one fire/life safety system component being sensed includes a fire suppression system component.

17. The system of claim 16, wherein said at least one fire suppression system component being sensed includes a component from the group consisting of a water-based fire protection system, a chemical system, a halon system, and a carbon dioxide system.

18. A system for verifying at least one life/fire safety component whose operation and maintenance are based upon predetermined operational criteria, the system comprising:

at least one sensor for sensing at least one of a parameter of said at least one fire/life safety system component and a resultant indicator thereof pertinent to operational criteria compliance verification;

means for date/time stamping sensor data from said at least one sensor in order to generate historic record data;

means at a site of said fire/life safety system for storing said date/time stamped sensor historic record data;

means at a location remote from the site of said fire/life safety system for generating an operational criteria compliance verification report based upon said sensor historic record data; and communication means for conveying said stored sensor historic record data to said remote means for generating said operational criteria compliance verification report;

wherein said predetermined operational criteria include fire/life safety codes and associated industry standards.

19. The system of claim 18, further comprising means at said remote location for forwarding said operational criteria compliance verification report from said remote location to at least one predetermined entity.

20. A method for verifying at least one fire/life safety system component whose operation and maintenance are based upon predetermined operational criteria that include fire/life safety codes and associated industry standards, said method comprising the steps of:

sensing, at a site of the fire/life safety system, at least one of a parameter of said at least one fire/life safety system component and a resultant indicator thereof pertinent to operational criteria compliance verification to obtain sensor data;

storing said sensor data along with associated date/time data in a recorder to form historic record data;

accessing said historic record data and verifying operational criteria compliance based on said historic record data and a predetermined operational criteria; and generating an operational criteria compliance verification report based upon said historic record data, wherein the step of verifying verifies code compliance with said fire/life safety codes and associated industry standards.

21. The method of claim 22, further comprising a step of forwarding said report to at least one predetermined entity.

22. The method of claim 21, wherein said step of forwarding is performed automatically.

23. The method of claim 21, wherein said step of forwarding forwards the report by one of E-mail, electronic transfer and facsimile.

24. The method of claim 20, wherein said step of report generating is performed from a location remote from said fire/life safety system site.

25. The method of claim 20, wherein said step of accessing includes storing the data in a database and said step of report generating includes accessing said data in said database and performing computational manipulations to said data, including computational comparisons with predetermined acceptable values, and generating a report indicating compliance/non-compliance.

26. The method of claim 25, wherein said step of report generating generates an operational criteria compliance verification report comprising: a report period; fire/life safety system location information; fire/life safety system normal parameters; date/time stamped sensor data; and a compliance/non-compliance summary.

27. The method of claim 20, wherein said step of accessing is performed automatically.

28. The method of claim 20, wherein said step of generating is performed automatically.

29. The method of claim 20, wherein said step of verifying is performed automatically.

30. The method of claim 20, wherein said at least one fire/life safety system component being sensed includes a fire detection/alarm system component.

31. The method of claim 30, wherein said at least one fire detection/alarm system component being sensed includes a component from the group consisting of a fire alarm control panel, a manual pull station, a smoke detector, a heat detector, a fire alarm signaling device, a fire suppression system interface, a fire pump system interface, a central station monitoring interface, and a life safety system interface.

32. The method of claim 31, wherein said at least one parameter being sensed is one of smoke detector activation, heat detector activation, manual pull station activation, fire alarm signaling device activation, status of fire suppression system, status of fire pump system, status of central station monitoring signal, FACP power, FACP back-up battery voltage, and FACP back-up battery current.

33. The method of claim 20, wherein said at least one fire/life safety system component being sensed includes a life safety system component.

34. The method of claim 33, wherein said at least one life safety system component being sensed includes a component from the group consisting of a smoke evacuation system, a smoke pressurization system, a heating ventilation and air conditioning (HVAC) shutdown system, an elevator recall system, a fire door open/close system, and a crossover to emergency (back-up) power system.

35. The method of claim 34, wherein said at least one parameter being sensed is one of status of smoke evacuation system activation signal, status of smoke pressurization system activation signal, status of HVAC shutdown system activation signal, status of elevator recall system activation signal, status of fire door system activation signal, status of emergency power system, air pressure, fire door position, elevator position, AC voltage, AC current, AC phase and AC frequency.

36. The method of claim 20, wherein said at least one fire/life safety system component being sensed includes a fire suppression system component.

37. The method of claim 36, wherein said at least one fire suppression system component being sensed includes a component from the group consisting of a water-based fire protection system, a chemical system, a halon system, and a carbon dioxide system.

38. The method of claim 21, wherein maintenance information comprises a part of said report and a step of forwarding said maintenance information and said step of forwarding said report are the same.

39. The method of claim 20, wherein said method further comprises the steps of sensing at least one of an additional parameter of said at least one fire/life safety system component and a resultant indicator thereof pertinent to component problem identification, and notifying at least one predetermined entity in real-time of the problem information.

40. The method of claim 39, wherein said problem information comprises a part of said report and said step of notifying is additionally performed with forwarding of said report.

41. The method of claim 20, further comprising a step of archiving said data and said report as a permanent record.

42. The method of claim 41, further comprising a step of analyzing said archived data for statistical analysis.

43. The method of claim 42, further comprising a step of utilizing said analyzed data to provide maintenance and troubleshooting information.

* * * * *